(12) United States Patent
Bayer et al.

(10) Patent No.: US 8,255,949 B1
(45) Date of Patent: Aug. 28, 2012

(54) TELEVISION PROGRAM TARGETING FOR ADVERTISING

(75) Inventors: Jason Bayer, Mountain View, CA (US); Steve Stukenborg, Mountain View, CA (US); Jeff T. Lu, San Francisco, CA (US); Walter Lee, San Francisco, CA (US); Salahuddin Choudhary, Mountain View, CA (US)

(73) Assignee: Google Inc., Mountain View, CA (US)

( * ) Notice: Subject to any disclaimer, the term of this patent is extended or adjusted under 35 U.S.C. 154(b) by 885 days.

(21) Appl. No.: 12/349,988

(22) Filed: Jan. 7, 2009

(51) Int. Cl.
*H04N 7/025* (2006.01)
(52) U.S. Cl. .............. 725/35; 725/32; 725/34; 725/36
(58) Field of Classification Search .............. 725/32, 725/34, 35, 36, 37–52
See application file for complete search history.

(56) References Cited

U.S. PATENT DOCUMENTS

| | | | |
|---|---|---|---|
| 5,857,190 A | 1/1999 | Brown | |
| 6,289,514 B1 | 9/2001 | Link et al. | |
| 6,324,519 B1 | 11/2001 | Eldering | |
| 6,438,751 B1 | 8/2002 | Voyticky et al. | |
| 6,507,949 B1 | 1/2003 | Jonason et al. | |
| 6,530,082 B1 | 3/2003 | Del Sesto et al. | |
| 6,983,478 B1 | 1/2006 | Grauch et al. | |
| 7,020,888 B2 | 3/2006 | Reynolds et al. | |
| 7,356,246 B1 | 4/2008 | Kobb | |
| 7,590,616 B2 | 9/2009 | Guan et al. | |
| 2002/0056107 A1 | 5/2002 | Schlack | |
| 2002/0087980 A1 | 7/2002 | Eldering et al. | |
| 2002/0129368 A1 | 9/2002 | Schlack et al. | |
| 2002/0133819 A1* | 9/2002 | Jackson | 725/39 |
| 2002/0174424 A1 | 11/2002 | Chang et al. | |
| 2003/0037333 A1 | 2/2003 | Ghashghai et al. | |
| 2003/0040962 A1 | 2/2003 | Lewis | |
| 2003/0046161 A1 | 3/2003 | Kamangar et al. | |
| 2003/0070167 A1 | 4/2003 | Holtz et al. | |
| 2003/0093783 A1 | 5/2003 | Nelson | |
| 2003/0101454 A1* | 5/2003 | Ozer et al. | 725/42 |
| 2003/0110497 A1 | 6/2003 | Yassin et al. | |
| 2003/0115585 A1 | 6/2003 | Barsness et al. | |
| 2003/0115597 A1 | 6/2003 | Yassin et al. | |
| 2003/0171990 A1 | 9/2003 | Rao et al. | |
| 2004/0148625 A1* | 7/2004 | Eldering et al. | 725/34 |
| 2004/0163107 A1 | 8/2004 | Crystal | |

(Continued)

FOREIGN PATENT DOCUMENTS

EP 1549055 A4 8/2010
(Continued)

OTHER PUBLICATIONS

Supplementary European Search Report for EP08745050, dated Oct. 7, 2011, 2 pages.

(Continued)

*Primary Examiner* — Pankaj Kumar
*Assistant Examiner* — Timothy Newlin
(74) *Attorney, Agent, or Firm* — Fish & Richardson P.C.

(57) ABSTRACT

Methods, systems, and apparatus, including computer program products are provided for television advertisement bidding that allows advertisers to target and/or exclude specific television programs. Advertisers can search for television programs and in response be provided with a list of scheduled air times for television programs. Additional programs can also be identified for advertising based on similar targeting criteria, such as demographics, ratings, and genre.

16 Claims, 15 Drawing Sheets

U.S. PATENT DOCUMENTS

| | | |
|---|---|---|
| 2004/0225562 A1 | 11/2004 | Turner |
| 2004/0230994 A1 | 11/2004 | Urdang et al. |
| 2004/0250281 A1 | 12/2004 | Feininger et al. |
| 2005/0021403 A1 | 1/2005 | Ozer et al. |
| 2005/0028188 A1 | 2/2005 | Latona et al. |
| 2005/0204385 A1 | 9/2005 | Sull et al. |
| 2005/0221403 A1 | 10/2005 | Gazenko |
| 2005/0222902 A1 | 10/2005 | Coit et al. |
| 2005/0235318 A1 | 10/2005 | Grauch et al. |
| 2005/0251444 A1 | 11/2005 | Varian et al. |
| 2005/0286860 A1 | 12/2005 | Conklin |
| 2006/0010470 A1 | 1/2006 | Kurosaki et al. |
| 2006/0050785 A1 | 3/2006 | Watanabe et al. |
| 2006/0064716 A1 | 3/2006 | Sull et al. |
| 2006/0085815 A1 | 4/2006 | Nguyen |
| 2006/0195866 A1 | 8/2006 | Thukral |
| 2006/0224445 A1 | 10/2006 | Axe et al. |
| 2006/0253323 A1 | 11/2006 | Phan et al. |
| 2006/0287915 A1* | 12/2006 | Boulet et al. .................... 705/14 |
| 2006/0288400 A1 | 12/2006 | Weston et al. |
| 2007/0011050 A1 | 1/2007 | Klopf et al. |
| 2007/0022032 A1 | 1/2007 | Anderson et al. |
| 2007/0157245 A1 | 7/2007 | Collins |
| 2007/0186229 A1 | 8/2007 | Conklin et al. |
| 2007/0261073 A1 | 11/2007 | Blumenschein et al. |
| 2007/0282906 A1 | 12/2007 | Gabriel |
| 2008/0019610 A1 | 1/2008 | Matsuzaka et al. |
| 2008/0022301 A1* | 1/2008 | Aloizos ........................... 725/34 |
| 2008/0092168 A1 | 4/2008 | Logan et al. |
| 2008/0092182 A1 | 4/2008 | Conant |
| 2008/0154858 A1 | 6/2008 | Manavoglu et al. |
| 2008/0195475 A1 | 8/2008 | Lambert et al. |
| 2008/0216107 A1 | 9/2008 | Downey et al. |
| 2008/0250446 A1* | 10/2008 | Zigmond et al. ................. 725/32 |
| 2008/0307454 A1* | 12/2008 | Ahanger et al. ................. 725/36 |
| 2009/0070836 A1 | 3/2009 | Aaby et al. |
| 2009/0150930 A1* | 6/2009 | Sherwin et al. ................. 725/35 |

FOREIGN PATENT DOCUMENTS

| | | |
|---|---|---|
| KR | 2000/0054179 | 9/2000 |
| KR | 2003/0070275 | 8/2003 |
| KR | 2006/0097268 | 9/2006 |
| WO | WO9945700 A1 | 9/1999 |
| WO | 99/52285 | 10/1999 |
| WO | WO0111506 A1 | 2/2001 |
| WO | 01/65747 | 9/2001 |
| WO | 03/050731 | 6/2003 |
| WO | 2005/010702 | 2/2005 |
| WO | 2006/020560 | 2/2006 |
| WO | 2006/127645 | 11/2006 |

OTHER PUBLICATIONS

Supplementary European Search Report for EP08745040, dated Oct. 7, 2011, 2 pages.

Communication, Supplementary European Search Report for EP Application No. 08733116.1 dated Jan. 12, 2012.

* cited by examiner

How long do you want to run your campaign?

[10/17/08] to [12/30/08]  — 802

What is the most you would like to spend, on average, per week?

The weekly budget [?] controls your costs. When the weekly limit is reached, on average, your ad will stop showing for that day. (The budget controls the frequency of your ad, not its position.) Raise or lower your budget as often as you like.

Enter your weekly budget: $  — 804
[100,000]

What is the most you are willing to pay per thousand impressions?

The maximum CPM[?] is the highest price you'll pay for each one thousand times your ad is displayed. (A $10.00 CPM would mean $10.00 for every thousand impressions, or one cent per impression.) The higher the amount, the better the chance that your ad will show.

Enter your maximum CPM: $ [6.00] (Minimum: $6:00)  — 806

[<< Back] [Continue >>]  — 808

TELEVISION PROGRAM TARGETING FOR ADVERTISING

BACKGROUND

This disclosure relates to media advertising.

An advertiser, such as a business entity, can purchase airtime during a television broadcast to air television advertisements. Example television advertisements include commercials that are aired during a program break, transparent overlays that are aired during a program, and text banners that are aired during a program.

When an advertiser desires to target a specific television program for advertising, the advertiser will typically purchase a spot that occurs during the airing of the television program on a specific network. However, if the television program airs on other networks, the advertiser must purchase spots from the other network if the advertiser also desires to advertise on the program across two or more networks. Furthermore, if the program is aired on many networks, such as a program that is currently in syndication, then the advertiser will need to engage many networks to determine from which networks spots should be purchased for advertising on the program.

Engaging multiple networks can be a time-consuming process for the advertiser. Furthermore, ratings information may not be available for many of these networks. Thus the advertiser may be simply left to guess as to which airings of the program and which networks will yield the highest return on investment for an advertising budget. Additionally, demographic information for these networks and programs may not be readily available for the advertiser. Therefore, the advertiser may lose advertising opportunities on other programs that may have a similar demographic.

SUMMARY

Described herein are systems and methods for television advertising. In general, one aspect of the subject matter described in this specification can be embodied in methods that include receiving a television program query from an advertiser; identifying television programs based on the television program query; providing the identified television programs to the advertiser in response to the television program query; receiving a selection of one of the identified television programs from the advertiser; associating the selected television program with an advertising campaign of the advertiser, the advertising campaign including one or more television advertisements; receiving a request for an advertisement for a television advertisement availability associated with the selected television program, the television advertisement availability scheduled to occur during a scheduled airing of the television program; and selecting, in response to the request, one of the advertisements of the advertising campaign associated with the selected television program for airing during a television advertisement availability associated with the selected television program. Other embodiments of this aspect include corresponding systems, apparatus, and computer program products.

Particular implementations of the subject matter described in this specification can be implemented to realize one or more of the following advantages. Relevant and effective advertisements for millions of television provider subscribers can be targeted to specific television programs locally and/or nationwide. The relevant advertisements can be selected by the advertiser, or, optionally, can be automatically selected by an advertising system configured to identify advertisements that are relevant to the specific television programs. Additionally, an advertiser can be provided with a list of additional programs that have similar demographics to television programs that are selected by the advertiser, thus increasing advertising opportunities. The system can be implemented organically or can be implemented with third-party infrastructure partners.

Additional details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8 is a screen shot of an example pricing environment.

Like reference numbers and designations in the various drawings indicate like elements.

DETAILED DESCRIPTION

Figure 1:
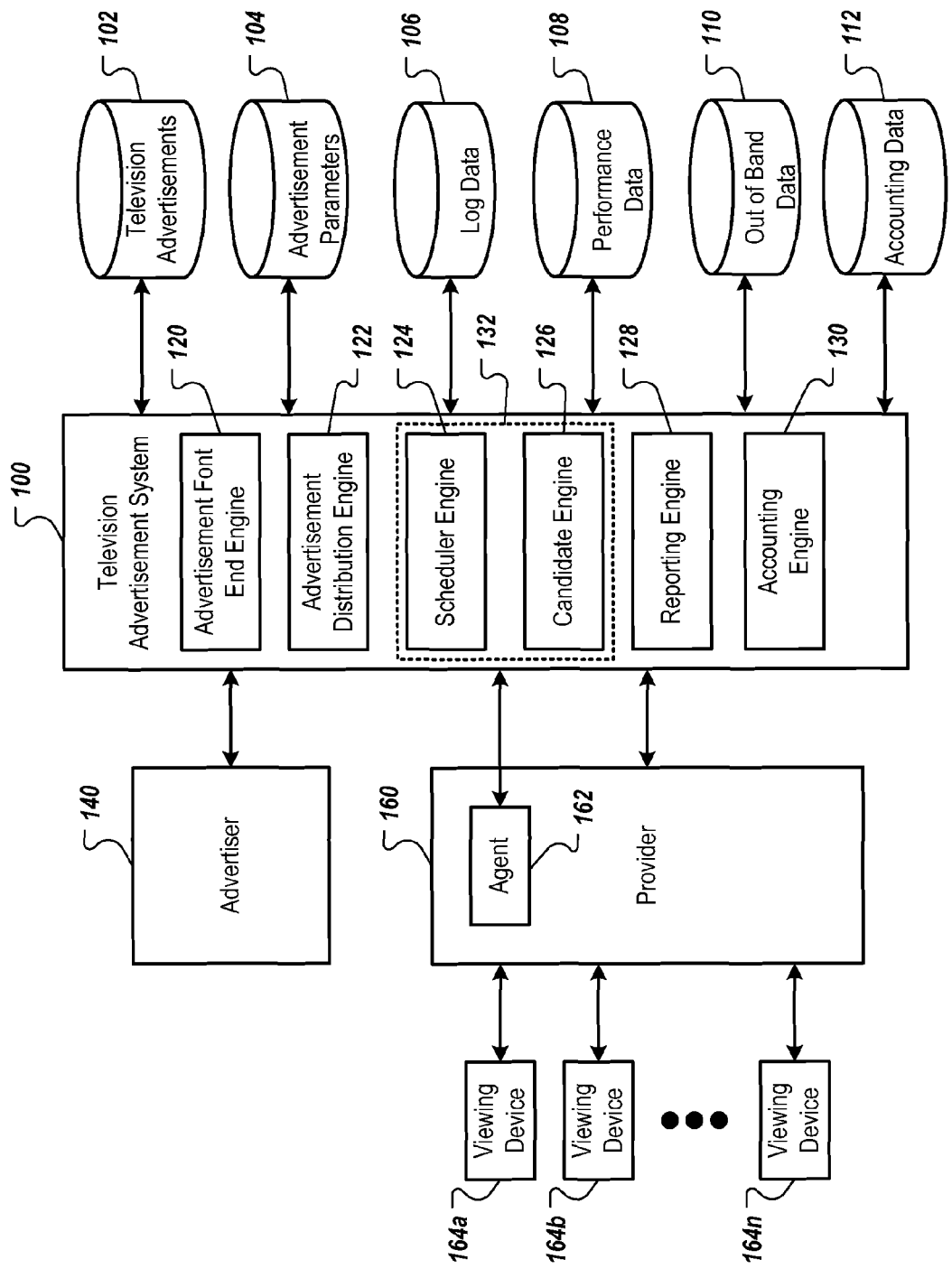
FIG. 1 is a block diagram of an example television advertisement system.

FIG. 1 is a block diagram of an example television advertisement system 100. The television advertising system 100 can, for example, deliver relevant content (e.g., advertisements, and hereinafter referred to generally as advertisements) advertisements to viewers to facilitate operator monetization of programming and quantification of advertisement delivery to target markets. The television advertising system 100 can, for example, be implemented on one or computer servers, and can provide and receive data over a network. Example networks include local area networks (LANs), wide area networks (WANs), telephonic networks, and wireless networks (e.g., 802.11x compliant networks, satellite networks, cellular networks, etc.). Additionally, the television advertising system 100 can, for example, communicate over several different types of networks, e.g., the Internet, a satellite network, and a telephonic network.

In general, the television advertising system 100 can receive television advertisements and advertisement campaign data from an advertiser 140, e.g. an entity that provides television advertisements, such as a commercial entity that sells products or services, an advertising agency, or a person. The television advertising system 100 can facilitate the provisioning of television advertisements to a television provider 160, e.g., an entity that facilitates the delivery of a television broadcast to viewers, such as cable provider, a digital satellite provider, a streaming media provider, or some other media provider. The provider 160 can, for example, receive a provider agent 162 from the television advertisement system 100. The provider agent 162 can, for example, be located at an advertising broadcast insertion location of the provider 162, e.g., at a head end of the provider.

The provider agent 162 can, for example, receive advertisement availability schedules from the provider 160 and provide the advertisement availability schedules to the television advertising system 100. For example, the provider agent 162 can read schedule requests, either in real time or ahead of time, and identify which schedule times the television advertising system 100 has permission to fill with advertisements provided by the television advertising system 100. Alternatively, the provider agent 162 can determine if one or more advertisements already scheduled or should/can be preempted or receive information that a scheduled advertisement should be preempted in accordance with one or more criteria (e.g., to improve revenue generation for the provider, or if an advertiser's budget has been depleted after a related advertisement was scheduled, etc.). The provider agent 162 can request the television advertising system 100 to identify a relevant advertisement for an identified airtime advertisement spot, e.g., an open advertisement slot or a preempted advertisement slot.

The advertisement can be deemed relevant based on advertisement meta data and an advertisement context, e.g., an advertisement for extreme sporting equipment for an advertisement having an available advertising budget may be selected for airing during a televised sporting event for which the meta data identifies as a primary demographic 18-30 year old males.

The television advertising system 100 can, for example, select candidate advertisements to air during an advertisement availability based on account advertiser bids, budgets, and any quality metrics that have been collected, e.g., conversions, viewer actions, impressions, etc. For example, advertisements can be selected to air during the advertisement availability according to a computer-implemented auction. One exampling auction is a Vickrey-style in which each advertiser pays the bid of the next highest advertisement. Other auction processes can also be used, e.g., setting an advertiser bid equal to the estimated number of viewer impressions multiplied by the price an advertiser has offered to pay for each impression, etc.

Different bidding types can be implemented in the computer-implemented auction. For example, the bidding types can be cost per airing, a cost per impression, a cost per full viewing of the advertisement, a cost per partial viewing of the advertisement, etc. Other types of costs per actions can also be use, such as phone calls resulting from phone call solicitations; a cost per network airing (e.g., $5.00 per 1000 impressions on a first network, $6.00 per 1000 impressions on a second network), cost per action scaled by the time of day, etc. An auction process can, for example, support ads with different or even multiple (hybrid) bidding types.

The advertisements selected from the television advertising system 100 auction, the advertisement air time, and/or the advertisement can be provided to the provider 160. For example, all available advertisements, or a subset thereof, can be provided to the provider 160 prior to airing, and the provider agent 162 need only receive an advertisement identifier indicating which advertisement is to air during particular advertisement air time.

The provider agent 162 can thereafter provide a status to the television advertisement system 100 regarding when the advertisement aired. The provider agent 162 can also, for example, provide anonymized impression data related to viewing devices 164a-164n. For example, logs related to viewing device 164 activity, e.g., set top box logs, can be anonymized to remove personal information related to viewing activities and provided to the television advertising system 100. In another implementation, such information can be provided by the provider 160, or by a third party.

In some implementations, based on the impression data for the airing of the advertisement, the television advertising system 100 can charge an advertiser a fee for airing the advertisement. The fee can, for example, be substantially in proportion to the number of impressions determined for a particular airing of an advertisement.

In some implementations, the fee can, for example, be based on the bidding type. For example, the bid may be based on a cost per airing, and thus an advertiser would be charged a fee for the airing of the advertisement. Other fee determinations can also be used.

The impressions can, for example, be measured statistically. An impression can be a household impression, e.g., the airing of an advertisement in household and independent of the number of televisions in a household. If the advertisement is aired on a viewing device in the household, one household impression can be recorded. Other impression types can also be used. For example, impressions can be generated by a program rating percentage, e.g., a percentage of viewership in measurable households; or by a program share percentage, e.g., a percentage of viewership in active measured homes; or by some other statistical measurement.

By way of another example, impressions can be measured by an analysis of activity logs of the viewing devices 164. For example, a household may have three viewing devices 164, and at a given time two of the devices may be tuned to a first channel and the third device may be tuned to a second channel. If a first commercial airs on the first channel and a second commercial airs on the second channel, impressions can be generated for each viewing device.

An impression can be dependant on a channel tune status when an advertisement airs on a channel. For example, an impression can occur when a viewing device 164 is tuned to a broadcast stream in which an advertisement is inserted, and the viewing device 164 remains tuned to the broadcast stream for N consecutive seconds during the actual display time of the insertion. For example, an impression can be defined as a viewing device remaining tuned to a broadcast stream for five seconds after the advertisement begins to air. Alternatively, an impression can be defined as a viewing device tuned to a broadcast stream when an advertisement is airing and remaining tuned to the broadcast stream for five seconds after tuning to the broadcast stream. Other tune times can also be used.

Likewise, other impression types can also be used. For example, an impression can be based on an advertisement exposure, e.g., a brief exposure of an advertisement, or a full viewing of the advertisement, of a threshold viewing in between, e.g., five seconds, or five seconds of the first fifteen seconds; or a percentage of the advertisement viewed, etc.

In some implementations, the television advertisement system 100 can also include one or more data stores to store television advertisements and associated data, e.g., meta data related to the television advertisements, performance data related to the television advertisements, accounting data related to the advertisers and television advertisements, etc. In some implementations, the television advertising system 100 includes an advertisement data store 102, an advertisement parameter store 104, a log data store 106, a performance data store 108, and an out of band data store 110. Additional advertisement related data can also be stored, e.g., an accounting data store 112 can store accounting data.

The television advertisement data store 102 can, for example, include advertisements that can be broadcast or aired during an advertisement spot. Example television advertisements include video advertisements, banner advertisements, overlay advertisements, such as logos, URLs, dynamic pricing information for an advertisement, etc., and other advertisements that can be used to convey information visually and/or aurally during a television broadcast.

The television advertisement parameter data store 104 can, for example, include cost per action parameters, frequency values, competitive restrictions, advertising budget data, geographic data, targeting data, etc. The television advertisement parameters 104 can, for example, be specified by the advertiser 140, and/or can be automatically updated based on the performance of advertisements during an advertisement campaign.

The log data store 106 can include data logs from viewing devices 164, e.g., set top boxes, satellite receivers, etc. The log data can include reporting data that identifies channel tunes, e.g., a channel identifier to which the viewing device was tuned, and channel tune times, e.g., the times that the viewing device was tuned to a channel. Other data can also be included, e.g., key presses of remote devices associated with the viewing devices 164, commands received by the viewing devices 164, etc. For example, if the viewing device 164 is a digital video recorder, the log data can include a list of recorded programs, and for each recorded program a record that indicates whether the recorded program has been played back, and the actions taken during playback, such as fast forwarding or skipping commercials can be included.

The performance data store 108 can, for example, include quality data, e.g., a total number of impressions for each advertisement, or an impression rate for each advertisement, and/or other quality parameter and/or impression parameters. Example impression rates include a percentage of total potential viewers, e.g., the number of identified impressions divided by the number of subscribers; a percentage of actual impressions of a total number of impressions, e.g., a percentage of reliable impressions divided by a total number of impressions. An example reliable impression is an impression that satisfies a rule set or condition that determines that the impression was likely viewed on a viewing device by one or more persons.

Other performance data can also be stored in the performance data store 108, e.g., performance of a particular advertisement during particular programming, the probability that viewers will tune to another channel during an advertisement; the probability that viewers will fast-forward through the advertisement; etc. Such probabilities can be normalized to average behavior on a per-advertisement basis, or on a per-time slot basis, or on some other measurable basis.

Performance data can also include data related to how much of an advertisement a viewer watched when the advertisement aired. For example, statistics related to aggregate tune-in and tune-out times; number of viewers, etc. can be measured and evaluated to determine quality data related to advertisements based on viewing percentages.

The out of band data store 100 can, for example, include data related to the relevance or popularity of particular advertisements, advertisement subject matter, and television programs. For example, web pages can be mined to determine whether particular television programs are expected to have increased viewership, e.g., a sudden increase in fan pages for a program can be correlated to an increase in an expected ratings value, and the resulting data can be stored in the out of band data store 110. Other data can include data related to search queries, page views on an advertise site, etc.

Likewise, the out of band data store 110 can, for example, store date resulting from mining a video web site to identify television advertisements that are particularly popular, e.g., a video web site may record viewing statistics that indicate a particularly humorous advertisement is relatively popular among a certain demographic. Such data can be used to further refine the advertising selection process.

Additionally, web sites related to television programs can be mined to determine relevance of products or services related to the television program. For example, a particular program may reference a product in an episode, and the mining of fan sites related to the program may reveal that the product mention has generated a significant interest in the product and related products. Accordingly, advertisements related to the product and related products may be deemed more relevant for time slots during the program.

The accounting data store 112 can, for example, store accounting data related to advertisements and advertisers 140. The accounting data store 112 can store such data as campaign budgets, monthly spend parameters, and account balances for advertisers.

Other data can also be stored, such as data that can be utilized to adjust viewing forecasts, adjust pricing models, adjust relevancy measures, etc. For example, performance data related to certain products or services advertised, e.g., anonymized historical campaign data, trend analysis of program viewership, e.g., viewing statistics of program series episodes in first run, repeat, and syndication, etc. can be stored for analysis. In some implementations, data related to advertisements that were aired during time slots not served by the advertisement system 100 can be stored to analyze other advertising market models, e.g., fixed priced advertising markets, reserved advertising markets, etc.

The advertisement data store 102, advertisement parameter store 104, log data store 106, performance data store 108, the out of band data store 110 and the accounting data store 112 can be implemented separately or in combination. For example, in some implementations, the advertisement data store 102, advertisement parameter store 104 and performance data store 108 can be implemented in a single advertisement database. Other combinations and/or subcombinations can also be used.

The television advertisement system 100 can include an advertisement front end engine 120, an advertisement distribution engine 122, a scheduler engine 124, a candidate engine 126, a reporting engine 128, and an accounting engine 130. The advertisement front end engine 120, advertisement distribution engine 122, scheduler engine 124, candidate engine 126, reporting engine 128, and accounting engine 130 can, for example, be distributed among a plurality of computer devices, e.g. server computers communicating over a network, or can be implemented on a single computer, e.g., as multiple threads on a server computer. Other implementation architectures can also be used. The advertisement front end engine 120, advertisement distribution engine 122, scheduler engine 124, candidate engine 126, reporting engine 128, and accounting engine 130 can, for example, be implemented in software, such as executable object code, interpreted script instructions, or in combinations of executable and interpreted instructions. Other software and/or hardware implementations can also be used.

The advertisement front end engine 120 can, for example, be configured to receive advertisement data and television advertisements from the advertiser 140 and associate the advertisement data with the television advertisements. In some implementations, the advertisement front end engine 120 can include a web-based interface through which the advertiser 140 can upload television advertisements and associated campaign data, e.g., advertising budgets; targeting data, such as demographics, television programs, and air times; product and/or service description data, such as vertical classifications; price ranges, subject matter, etc.

In some implementations, the advertisement front end engine 120 can include an approval engine configured to identify a television advertisement pending approval by the television provider 160. Utilizing the approval engine 160, the publisher may optionally review an advertisement and either approve or disapprove of the advertisement. For example, a cable provider may disapprove of advertisements that are of particularly low quality, e.g., poor sound quality, incorrect advertisement data, etc.

In some implementations, the advertisement front end engine 120 can include (or have access to) a search engine that is used to identify television programs in response to advertiser queries and/or filter rules. The advertisement front end engine 120 is described in more detail in FIG. 2. The search functionality is described in more detail in FIGS. 5-13.

The advertisement distribution engine 122 can, for example, be configured to provide approved advertisements to the television provider 160. In some implementations, the advertisements are provided to the television provider 160 in advance of airing the advertisements. The provider agent 162 can periodically issue a request to the television advertising system 100 for any new advertisements to be downloaded. For any such advertisements, the provider agent 162 or the distribution engine 122 can initiate the download, and upon successful completion the provider agent 162 can notify the television advertising system 100 of a successful download. The television advertising system 100 can, for example, label the download with a particular ID that can be later used during scheduling to identify the scheduled advertisement. Accordingly, the publisher 160 can receive an advertisement identifier associated with an advertisement availability, e.g., a time slot, and can retrieve the advertisement locally at the television provider 160 premises and insert the selected advertisement into the broadcast stream.

The television advertisement scheduler engine 124 can, for example, be configured to receive a television advertisement request defining a television advertisement availability from the television provider 160, and issue a request for candidate television advertisement data, e.g., data related to advertisements that are candidates for being selected to fill the advertisement availability. The television advertisement request can include geographic data, provider identification, network data, program data, and other data. For example, a request can specify advertisements that can be shown in the geographic area of the USA/California/Bay Area/Mountain View, with an identifier of XX of a television provider, for a television provider YY, on a television network ZZ, to be scheduled within the time window of Monday 2:00 PM-3:00 PM, and at a preferred time of 2:16 PM.

The candidate engine 126 can, for example, be configured to identify candidate television advertisement data in response to the request for candidate television advertisement data. The identification can be based on data associated with the television advertisements, such as the data stored in the advertisement parameter data store 104. The candidate engine 126 can implement various targeting and/or filtering rules. For example, a budget restriction can be imposed if an advertiser budget is nearly depleted, and the expected fee for airing the advertisement based on expected impressions would exceed the remaining advertising budget.

Other example rules include the advertisement being successfully downloaded to the television provider 160; the advertisement targeting the location or a superset of the location where the advertisement will be showing; the advertiser 140 or advertisement must not be considered fraudulent or delinquent; the publisher 160 has approved the advertisement for showing; the advertisement is targeting this particular television network and/or time; the advertisement is targeting a television program which, through internal or third party data sources, corresponds to the given request; and the advertisement is targeting a demographic profile which, through internal or third party data sources, corresponds to the given request. Fewer or more filtering and targeting conditions can also be applied.

In response to receiving the candidate advertisement data, the television advertisement scheduler engine 124 can select one or more television advertisements to air during the television advertisement availability. The selection can be based on the television advertisement request and the candidate television advertisement data. For example, the television advertisement request can be utilized to determine a context, e.g., the context of the programming associated with the advertisement, such as a sporting event, an entertainment genre, a news program, etc.; or the context of the television network, e.g., a network type; or the context of a television channel; or the context of the time of day; or a combination of any of such examples. The context can be utilized to determine a relevancy score, and the relevancy score can be utilized to scale an auction result so that bids related to advertisements that are more relevant to the identified context are scaled higher than bids related to less relevant advertisements.

In some implementations, the scheduler engine 124 and/or the candidate engine 126 can enforce advertisement restrictions. For example, the scheduler engine 124 and/or the candidate engine 126 can filter the advertisements to eliminate unwanted advertisements, e.g., frequency capping can be performed to limit the scheduling of certain advertisements based on an amount of time since the advertisement was last aired; competitive restrictions can be applied so that one advertisement cannot be placed near another advertisement of a competitor, etc.

The reporting engine 128 can, for example, receive television advertisement report data from the provider 160 and determine whether the selected television advertisement aired based on the television advertisement report data. For example, an advertisement may not air due to a programming irregularity, e.g., a sporting event going beyond a scheduled broadcast, an interruption to scheduled programming due to breaking news, etc. In some implementations, the reporting engine 128 can process reporting logs, e.g., set top box logs from viewing devices 164 to determine advertisement impressions.

The accounting engine 130 can, for example, receive the impression data from the reporting engine 128 and generate accounting data for advertisers. In some implementations, the accounting data can detail fees owed to the television advertising system 100. The fees can, for example, be based on a cost per action parameter associated with an advertisement.

For example, if an advertiser has specified $10.00 as a maximum cost per thousand impressions for a television commercial, and the reporting data indicates that 420,000 reliable impressions were generated from airing the advertisement, then the advertiser may be billed for $4,200.

In another implementation, the accounting data can detail fees owed to the television advertising system 100 and the publisher pursuant to a revenue sharing agreement. An example revenue sharing agreement can include a percentage split between the operator of the television advertisement system 100 and the television provider 160. For example, the operator of the television advertising system may receive 20% of the fee, and the operator of the publisher 160 may receive the remaining 80% of the fee. Another example revenue sharing agreement can include a first fee up to a maximum cap going to the operator of the television advertisement system, and the remaining fee going to the operator of the television provider 160. For example, the operator of the television advertising system may receive the first $500 of the fee, and the operator of the publisher 160 may receive the remainder of the fee. Other revenue sharing agreements can also be used.

The advertisement front end engine 120, advertisement distribution engine 122, scheduler engine 124, candidate engine 126, reporting engine 128, and accounting engine 130 can be implemented separately or in combination. For example, in some implementations, the scheduler engine 124 and the candidate engine 126 can be integrated as a single auction engine 132 on a computing device. Other combinations and/or subcombinations can also be used.

The system 100 of FIG. 1 can also facilitate the serving of other types of advertisement availabilities. For example, in addition to serving advertisement availabilities related to advertisement spots, times slots, and pods, advertisement availabilities that are dynamic, e.g., availabilities that are decided in real time, can also be served. An example dynamic availability can include the canceling of a scheduled advertisement, either at the request of the advertiser or automatically, such as when the advertiser's budget is depleted; or in the event of a programming delay, e.g., a programming delay for a live event, etc.

Figure 2:
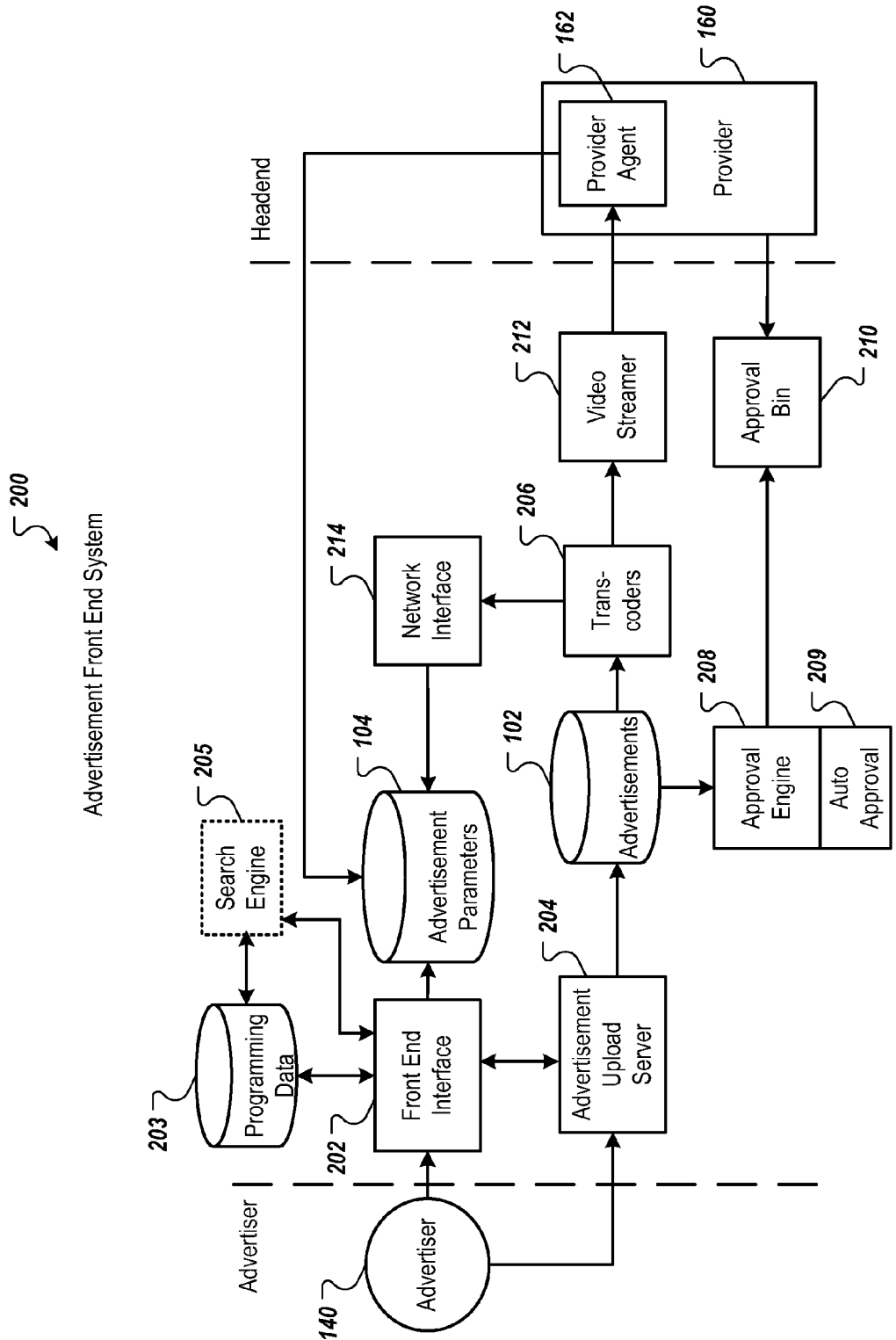
FIG. 2 is a block diagram of an example television advertisement front end system.

FIG. 2 is a block diagram of an example television advertisement front end system 200. The television advertisement front end system 200 can, for example, be implemented in the advertisement system 100 of FIG. 1.

The advertisement front end system 200 can facilitate the provisioning of advertisement data and television advertisements from the advertiser 140 or an agent of the advertiser, and can facilitate associating the advertisement data with the television advertisements. In some implementations, the advertisement front end system 200 can include a web-based front end interface 202 and an advertisement upload server 204 through which the advertiser 140 can upload television advertisements and associated campaign data associated with the advertisements, e.g., advertising budgets, targeting data, such as demographics and air times, product and/or service description data, such as vertical classifications, price ranges, subject matter, etc. FIGS. 5-10 provide example front end user interface environments.

In some implementations, the advertisement front end system 200 includes (or has access to) a search engine 205. The front end interface 202 can access programming data 203 that stores metadata for television programs and the search engine 205 to search the programming metadata to identify television programs responsive to queries and/or filtering rules. The search engine 205 can use any number of search algorithms to facilitate search capabilities.

The programming metadata includes data that describes the television program, air times for the television program, and other associated data, such as genre categories, program descriptions, cast members, ratings, and the like. The programming data 203 can be provided by a programming data provider, such as a media service company.

In some implementations, the programming data 203 can also include metadata that is collected from other data sources, such as the out of band data 110 collected from the mining of web pages. For example, fan pages for television programs and official web sites of television programs can be mined and additional metadata related to the television programs can be stored in the programming data store 203. Such additional metadata can include unique fan terms, demographics, and hyperlinks to other program sites from within the fan sites.

In some implementations, the related programs are identified by the advertisement front end system 200 based on the hyperlinks, and these relations are stored in the programming data metadata 203. For example, if two television programs have television program sites that include hyperlinks to each other, then the metadata for these two television programs can identify the television programs as having a related fan base based on the hyperlinks.

In some implementations, closed caption data for some television programs can be stored in the programming data 203. The close caption data, i.e., text data, can be provided by the programming data provider.

In some implementations, the programming data 203 can also store search categorization metadata for the television programs. The search categorization metadata can define term clusters for television programs belonging to the same category or genre. The term clusters can include terms of the program listings for each cluster and additional related terms. These additional related terms can support a broad match search functionality. For example, television programs belonging to a children's programming category may include the following terms in the program listing: "children", "child", "learning", and "educational." These terms can be used to identify related terms and phrases, such as "diapers", "toys" and "childhood development."

The term clusters can be generated by use of clustering and term expansion algorithms, and can be used to facilitate broad matching for advertiser searches, as described below.

The programming metadata 203 and other data, such as advertisement parameters 104, log data 106, performance data 108, out of band data 110, and accounting data 112, can be searched by an advertiser 140 by use of the front end interface 202 so that the advertiser 140 can target specific television programs for advertising. Such functionality is described in more detail with reference to FIGS. 5-13 below.

In some implementations, the advertisement upload server 204 can receive digital representations of the advertisements, e.g., video files, audio files, and text data files, that define the advertisements, e.g. video advertisements, including commercials, banners, and logo overlays; audio advertisements, and text-based advertisements. In another implementation, the advertisements can be provided to the advertising front end system 200 in either digital or analog form, e.g., video tapes, DVDs, etc., for processing for storage into the advertisement data store 102.

The advertisements stored in the advertisement data store 102 may require transcoding into one or more different presentation formats. For example, an advertisement may be provided in high definition and in a first aspect ratio; the advertisement may thus be transcoded to conform to another video standard, such as NTSC or PAL. The transcoded advertisements can be accessed by a video streamer 212 and provided to provider 160 for local storage. In some implementations, the provider agent 162 can poll the advertisement front end system 200 periodically, e.g., daily or weekly, to request any new advertisements that have been uploaded and processed by the advertisement front end system 200. Alternatively, the provider agent 162 can request new advertisements after being unable to locate an advertisement locally, or if the provider 160 indicates that an advertisement cannot be located in a local data store.

In some implementations, newly added advertisements can be designated as pending approval, and an approval engine 208 can be configured to identify television advertisements pending approval by a television provider and store the pending advertisements, or links to the pending advertisements, in an approval bin 210. The approval engine can receive television provider 160 approval data for each television advertisement pending approval and approve or disapprove the television advertisement based on the television provider approval data. Approved advertisements can thereafter be downloaded or otherwise accessed by the provider 160; conversely, disapproved advertisements will not be provided to the provider 160. Accordingly, only approved advertisements will air on broadcast signals generated by the provider 160.

In some implementations, advertisements awaiting approval can be automatically approved after an expiration of a time period, e.g., 72 hours. In another implementation, advertisements awaiting approval can be automatically disapproved after an expiration of the time period.

In another implementation, the approval engine can receive front end system 200 approval data for each television advertisement pending approval and approve or disapprove the television advertisement based on the front end system 200 approval data. For example, an operator of the front end system 200 may enforce various polices for advertisements, e.g., quality requirements, subject matter, etc.

In some implementations, the approval engine 208 can include an automated approval engine 209 that is configured to store approval criteria for each presentation format and evaluate a television advertisement in a presentation format against the corresponding approval criteria. Based on the evaluation, the automated approval engine 209 can automatically approve or disapprove the advertisement. For example, approval criteria based on color balance, sound balance, etc., can be utilized to automatically approve a transcoded advertisement. The automatically approved advertisements or access to the automatically approved advertisements can thereafter be provided to the approval bin 210.

After the advertisements are downloaded to the provider 160, or after the provider is otherwise provided access to the advertisements so that the advertisements can be aired by the provider, the provider agent 162 can provide an acknowledgment signal to the advertisement front end system 200. The acknowledgement signal can, for example, specify that the publisher has received an advertisement or otherwise has access to the advertisement for airing. The acknowledgement signal can identify the publisher and be stored in the advertisement parameter data store 104 so that each advertisement can be associated with a corresponding list of publishers 160 that can air the advertisement.

In some implementations, a network interface 214 can be utilized to provide access to the advertisements stored in the advertisement data store 104. For example, the network interface 214 can include a search engine interface and can serve the advertisements over a network, such as the Internet, in response to search queries that are relevant to the advertisement. In some implementations, the advertiser 140 can specify whether an advertisement that can be aired by the publisher can likewise be served over a network through the network interface 214.

Figure 3:
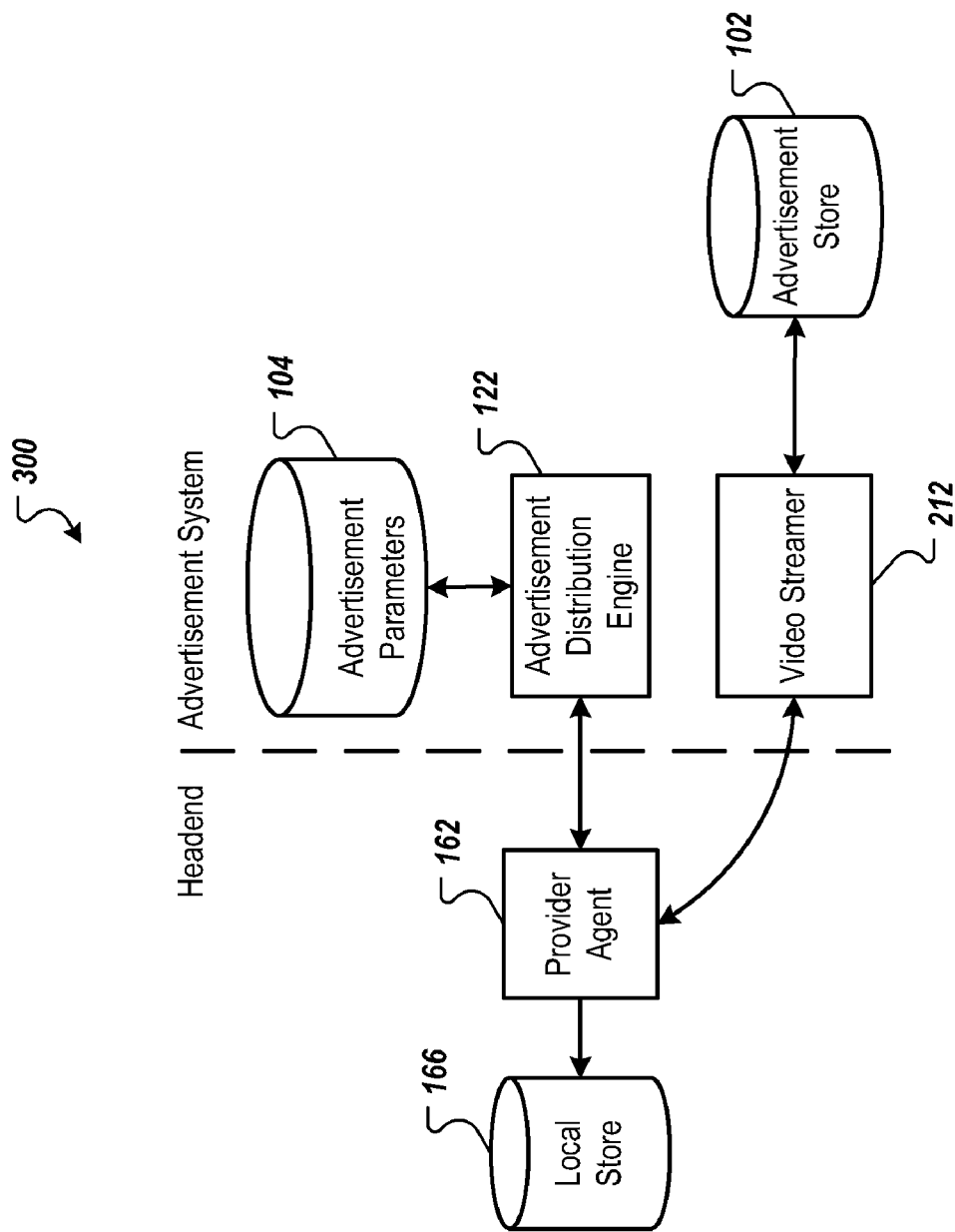
FIG. 3 is a block diagram of an example television advertisement distribution system.

FIG. 3 is a block diagram of an example television advertisement distribution system 300. The advertisement distribution system 300 can, for example, be implemented in the advertisement system 100 of FIG. 1.

The advertisement distribution system 300 facilitates the storing of advertisements on a local data store, e.g., local store 166, associated with the television advertiser 160. The storage of the advertisement at a local store 166 can, for example, facilitate real-time or near real-time auctioning and scheduling of advertisements, e.g., auctioning and scheduling advertisements for available time slots or spots only hours or even minutes before the occurrence of the time slot.

In some implementations, the provider agent 162 can communicate with the advertisement distribution engine 122 to determine whether advertisements are available for storage on the local store 166. In some implementations, the provider agent 162 can poll the advertisement distribution engine 122 periodically, e.g., daily, weekly, etc. In another implementation, the advertisement distribution engine 122 can send a notification to the provider agent 162 when an advertisement is available for download, e.g., in response to the provider 160 approving one or more advertisements.

If advertisements are available for download, the advertisement distribution engine 122 can direct the provider agent 162 and a video streamer, e.g., the video steamer 212, to establish a communication session for downloading the advertisements from the advertisement store 102 to the local store 166. Additional data can also be downloaded, e.g., an advertisement identifier, or other advertisement parameters, e.g., stored in the advertisement parameter store 104. Upon a successful completion of the download, the provider agent 162 can send an acknowledgement signal to the advertisement distribution engine 122. The acknowledgment signal can, for example, be utilized to associate an advertisement with a television provider location, and to indicate that the television advertisement is stored in a local store 166 at the locus of the provider 160.

In some implementations, the advertisement distribution engine 122 can evaluate advertisement parameters stored in the advertisement parameter store 104 to determine which providers 160 the advertisements should be distributed. For example, if the advertisement parameters specify that an advertisement is related to a California marketing campaign, the advertisement will only be distributed to providers 160 that service the California market.

In some implementations, the advertisement can be transcoded by the advertisement system 100 into a presentation format specified by the provider 160. In another implementation, the provider 160 can receive the advertisement in a standard format, e.g., and MPEG format, and transcode the advertisement into a suitable presentation format.

In another implementation, the advertisements can be streamed from the television advertising system 100 to the provider 162 in near-real time or during air time. Accordingly, the advertisements need not be stored in a local data store 166.

Figure 4:
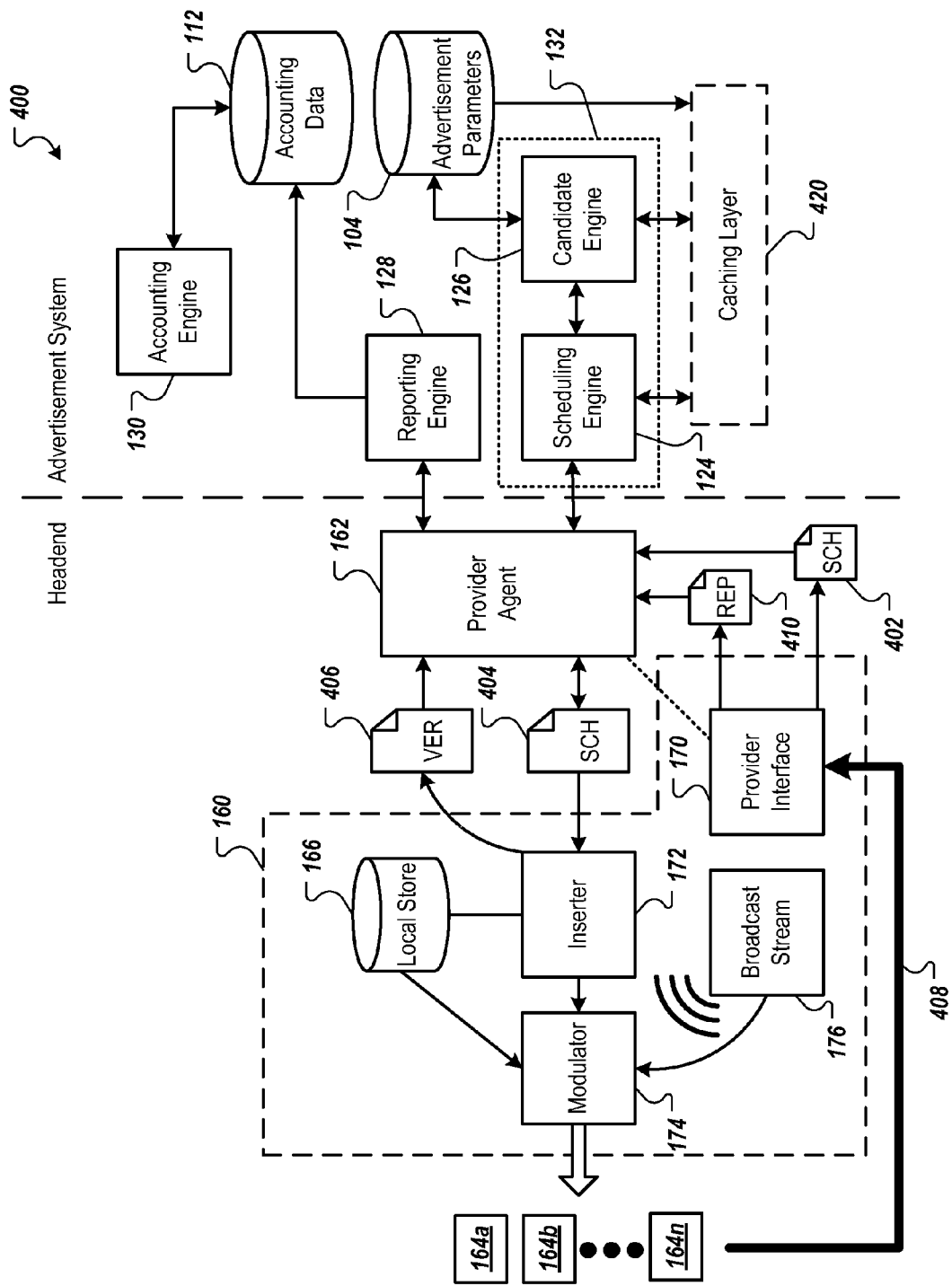
FIG. 4 is a block diagram of an example television advertisement scheduling and reporting system.

FIG. 4 is a block diagram of an example television advertisement scheduling and reporting system 400. The television advertisement scheduling and reporting system 400 can, for example, be implemented in the advertisement system 100 of FIG. 1.

In some implementations, the provider agent 162 can receive advertisement requests or advertisement availabilities in the form of an availability schedule 402. The availability schedule 402 can include a list of advertisement availabilities, e.g., time slots, corresponding contexts, e.g., television programs, the advertisement availability type, e.g., a single spot or a pod of several spots; and other data, such as geographic data, provider identification data, network data, etc.

The availability schedule 402 can, for example, be provided periodically, e.g., on a weekly basis for a coming week; or on a daily basis, or at near real-time or in real time. The provider agent 162 can, for example, communication with a provider interface 170, such as an API for a data server managed by the provider 160. In another implementation, the provider interface 170 can be implemented in the provider agent 162.

The provider agent 162 can provide the availability schedule 402 to the scheduling engine 124 of the advertisement scheduling and reporting system 400. The scheduling engine 124 can, for example, communicate with the candidate engine 126 to identify candidate television advertisement data associated with advertisements that are eligible to fill the advertisement spots that are specified in the availability schedule 402. The candidate engine 126 can implement various targeting and/or filtering rules as described with respect to FIG. 1 above.

The scheduling engine 124 can select one or more television advertisements to air during the television advertisement availability defined in the availability schedule 402. The selection can be based on the availability schedule 402, e.g., the time slots and associated context, and the candidate television advertisement data. The context can be utilized to determine a relevancy score, and the relevancy score can be utilized to scale an auction result so that bids related to advertisements that are more relevant to the identified context are scaled higher than bids related to less relevant advertisements.

The scheduling engine 124 can utilize a Vickrey-style auction based on a cost per action, e.g., a cost per 1000 impressions, or a cost per network ($5.00 on network M, $6.00 on network Y), etc., multiplied by a quality score, e.g., a historical impression rate associated with the advertisement, such as a number of viewers that are determined to have viewed the advertisement divided by the total number of viewers that received the advertisement. Other factors that can be used to determine the quality score can be derived from the performance data stored in performance data store 108, e.g., the performance of a particular advertisement during particular programming, the probability that viewers will tune to another channel during an advertisement; the probability that viewers will fast-forward through the advertisement; etc.

For example, assume the candidate engine 126 identifies three advertisements suitable for a particular advertisement spot. The scheduling engine 124 may determine an auction rank of the advertisements by multiplying the maximum cost per action for the advertisements by the quality score of the advertisements. To illustrate, suppose the quality score (QS) of advertisements A, B, and C are "2," "3," and "1.2," respectively. The rank of advertisements A, B, and C can be determined as follows:

A: Rank=QS×maximum cost per action=2.0×$5.00=10.00
B: Rank=QS×maximum cost per action=3.0×$7.50=22.50
C: Rank=QS×maximum cost per action=1.2×$10.00=12.00

The advertisers can thus be ranked as follows:
1. B
2. C
3. A

Accordingly, the advertisement B would be selected and displayed during the advertisement spot. In some implementations, the actual cost an owner of the advertisement B will pay per thousand impressions can be determined by the subsequent advertisement rank (C) divided by the score of the advertisement B, e.g., 12/3=$4.00. Other auction processes can also be used.

In another implementation, for a set of advertisement spots, e.g., a pod of several 30-second advertisement spots, each spot can be auctioned separately. In another implementation, an entire pod can be auctioned, and the highest ranked advertisements can be selected for showing during the pod. For example, if the auction illustrated above for advertisements A, B and C was conducted for a pod of two advertisement spots, commercials B and C would be selected.

In some implementations, an impression rate can be set to an initial default value, e.g., a rate equal to an aggregate impression rate for advertisements in a related demographic or targeting area, and can thereafter be modified based on historical performance.

In some implementations, the scheduler engine 124 and/or the candidate engine 126 can enforce advertisement restrictions. For example, the scheduler engine 124 and/or the candidate engine 126 can filter the advertisements to eliminate unwanted advertisements, e.g., competitive restrictions can be applied so that one advertisement cannot be placed near another advertisement of a competitor. For example, a television advertisement availability window for an advertisement spot can be generated. The advertisement availability window can be time based, e.g., five minutes, or can be advertisement based, e.g., three advertisement spots prior to the advertisement spots and three advertisement spot subsequent to the advertisement spot. Advertisements that have associated competitive restrictions that are exclusive of the competitive restrictions of the television advertisements that are selected to air during the television advertisement availability window can thus be precluded from selection for that availability window. For example, if company A and company B are direct competitors for the same product, and an advertisement slot is available for auction, an advertisement for company B may only be eligible to auction if an advertisement for company A has not or will not air during the associated advertisement availability window e.g., within a predetermined number of advertisement slots or predetermined amount of time.

Frequency capping can be performed to limit the scheduling of certain advertisements based on an amount of time since the advertisement was last aired. For example, frequency values associated with the television advertisements can be recorded, e.g., the rate of showings of the advertisements per hour. If a current frequency value of an advertisement exceeds a repetition threshold, the advertisement may be precluded from being shown during an advertisement availability.

Likewise, geographic data can be used to filter local advertisements. For example, the availability schedule may define an advertisement availability in San Francisco, Calif. Accordingly, targeted local advertisements that are not targeted to San Francisco, e.g., a local car dealership in Los Angeles, Calif., may be precluded from being shown during an advertisement availability for the locality of San Francisco.

Once the advertisements are selected for an advertisement availability, data related to the selected advertisements and intended display times, e.g. advertisement identifiers and corresponding time slots that the corresponding advertisements are to be shown, can be provided to the provider 160 as an advertisement schedule 404. The advertisement schedule 404 can be accessed by an inserter 172 and a modulator 174 that are utilized to insert advertisements stored in the local store 166 into a broadcast stream 176.

A verification report 406 that includes data indicating whether the advertisement aired can be provided to the provider agent 162. In some implementations, the verification report 406 includes data that indicates whether the advertisement aired, the air time of the advertisement, and the channel on which the advertisement aired. The provider agent 162 can, in turn, transmit the verification report 406 to the television advertisement scheduling and reporting system 400 for processing by the reporting engine 128 and storing in the accounting data 112. Depending on contractual obligations, e.g., whether the advertisers are billed according to impressions or are charged a flat fee, the accounting engine 130 may then charge any fees due to the corresponding advertiser account.

In another implementation, data related to actual viewings, e.g., impression data 408, can be provided to the provider 160. The impression data 408 can, in turn, be provided to the provider agent 162 as an impression data report 410. The impression data report 410 can be provided to the reporting engine 128 for processing to determine an impression value related to the actual and/or estimate of the number of impressions. The impression value can be used by the accounting engine 130 to charge any fees due to the corresponding advertiser account.

In some implementations, the impression data 408 can be defined by viewing device 164 logs, e.g., set top box activity data. For example, user activity, including channel changes and timestamps, can be recorded and provided to the provider 160 periodically, e.g., daily or weekly, in the form of logs. The logs can, for example, be processed by the reporting engine 128 so that the timestamps are correlated to the times of advertisement insertions. In some implementations, each viewing device 164 that was tuned to a broadcast stream during a time at which an advertisement was inserted is counted as an impression. Additionally, other impression data can also be determined, such as tune-in and tune-away times for partial views of an advertisement. As the log data can effectively measure impressions for tuned televisions, multiple impressions can be generated per household.

In another implementation, a caching layer 420 can be utilized to cache data related to advertisement selection and processing of advertisement requests. The caching layer 420 can, for example, be utilized to optimize performance of the auctioning process.

In some implementations, the provider agent 162 can anonymize data related to particular viewing devices 164 and account information before the data are received by the television advertising scheduling and reporting system 400. Each viewing device 164 can be represented as an anonymous entity, and account information can be associated with a location information that has no more granularity than a zip code.

In another implementation, the impression data 408 can be defined by statistical measurements, e.g., by local and/or regional sampling and extrapolation to a viewership estimate, and can be provided by a third party. For example, Nielsen ratings data can be used to determine a viewership estimate and corresponding impression estimate.

In another implementation, advertisements can be targeted to video-on-demand users, digital video recorder users, and the like. Accordingly, the advertisement scheduling data 404 can include real time or near real time requests.

FIGS. 5-10 are example television advertisement front end environments. The front end environments of FIGS. 5-10 can, for example, be implemented as a web-based user interface for advertisers 140 to the advertising system 100 bodies in the advertisement front end engine 120. Other front end environments, however, can also be used. The front end environments of FIGS. 5-10 can be utilized to provide advertisements to the television advertisement system 100, and to provide television advertisement parameters and other data for association with the advertisements. Although FIGS. 5-10 provide particular examples of advertisement front end environments, many other types of front end environments can be used to realize the functionalities described with respect to these example front end environments.

Figure 5:
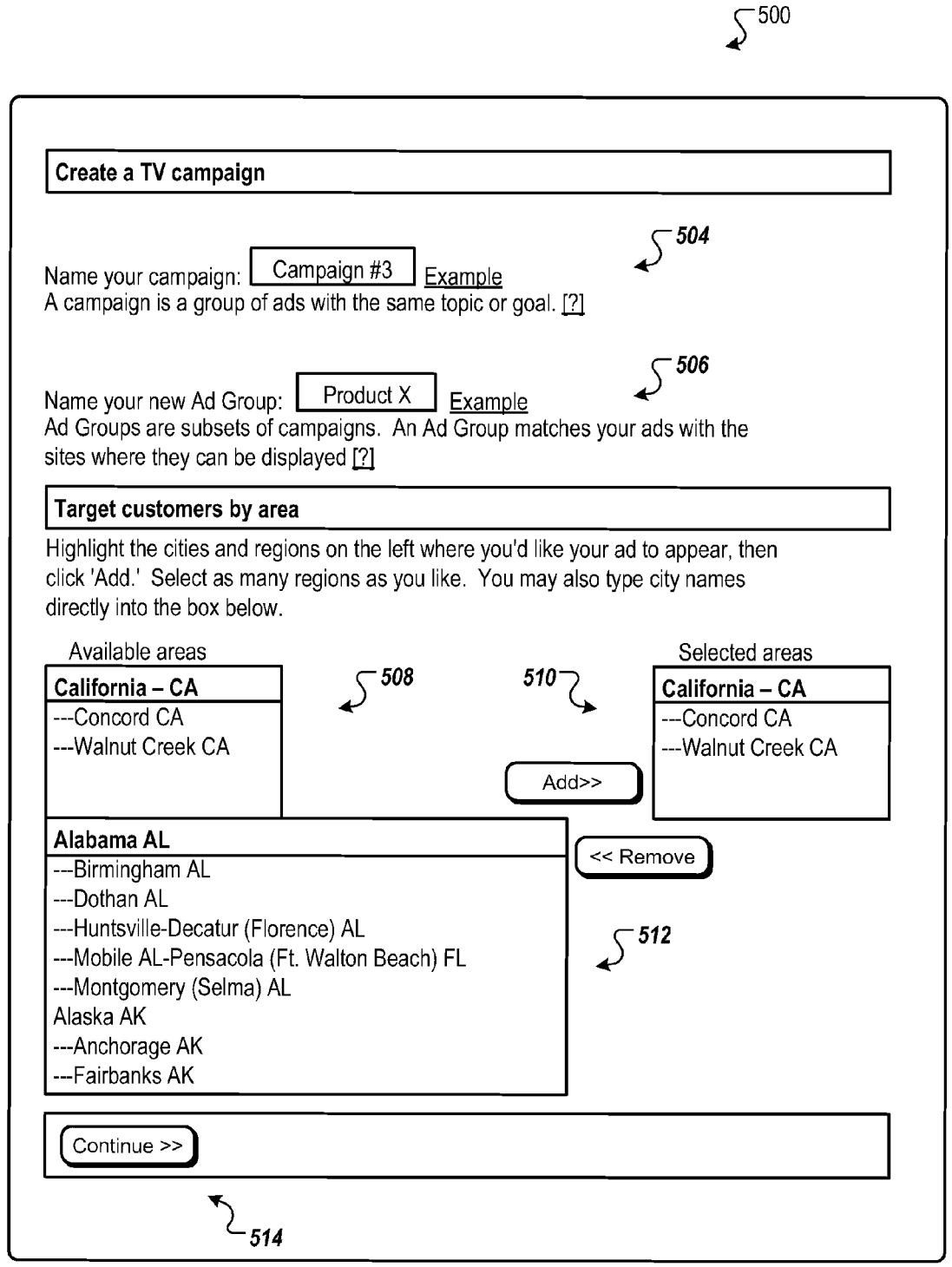
FIG. 5 is a screen shot of an example targeting area environment.

FIG. 5 is a screen shot of an example targeting area environment 500. The targeting area environment 500 can be used by an advertiser to target an advertising campaign to specific geographic areas.

A campaign name can be entered in a campaign name field 504. A campaign can, for example, be a set of advertisements that are subject to a particular advertising rule set, e.g., a set of advertisements that share a common target demographic, for example.

An Ad Group can be defined in an Ad Group name field 504. An Ad Group can, for example, be a subset of a campaign. For example, a nation wide advertisement campaign can be divided into regional Ad Groups, e.g., Boston, Los Angeles, Seattle, etc. Alternatively, an Ad Group can define a particular product or service within the campaign. In the example screenshot 500, the Ad Group relates to a product, i.e., "Product X."

An Available Areas frame 508 can be browsed to select available areas to target the advertisement campaign, and a Selected Areas frame 510 can display selected areas for the campaign. As shown in FIG. 5, available areas are divided into state regions. Additional geographic areas can be loaded into the Available Areas frame 508 by selecting an additional area, e.g., a state, in the Additional Areas frame 512.

A navigation button 514 can be selected to continue to the next advertisement front end environment, an advertisement creation and upload environment 600.

Figure 6:
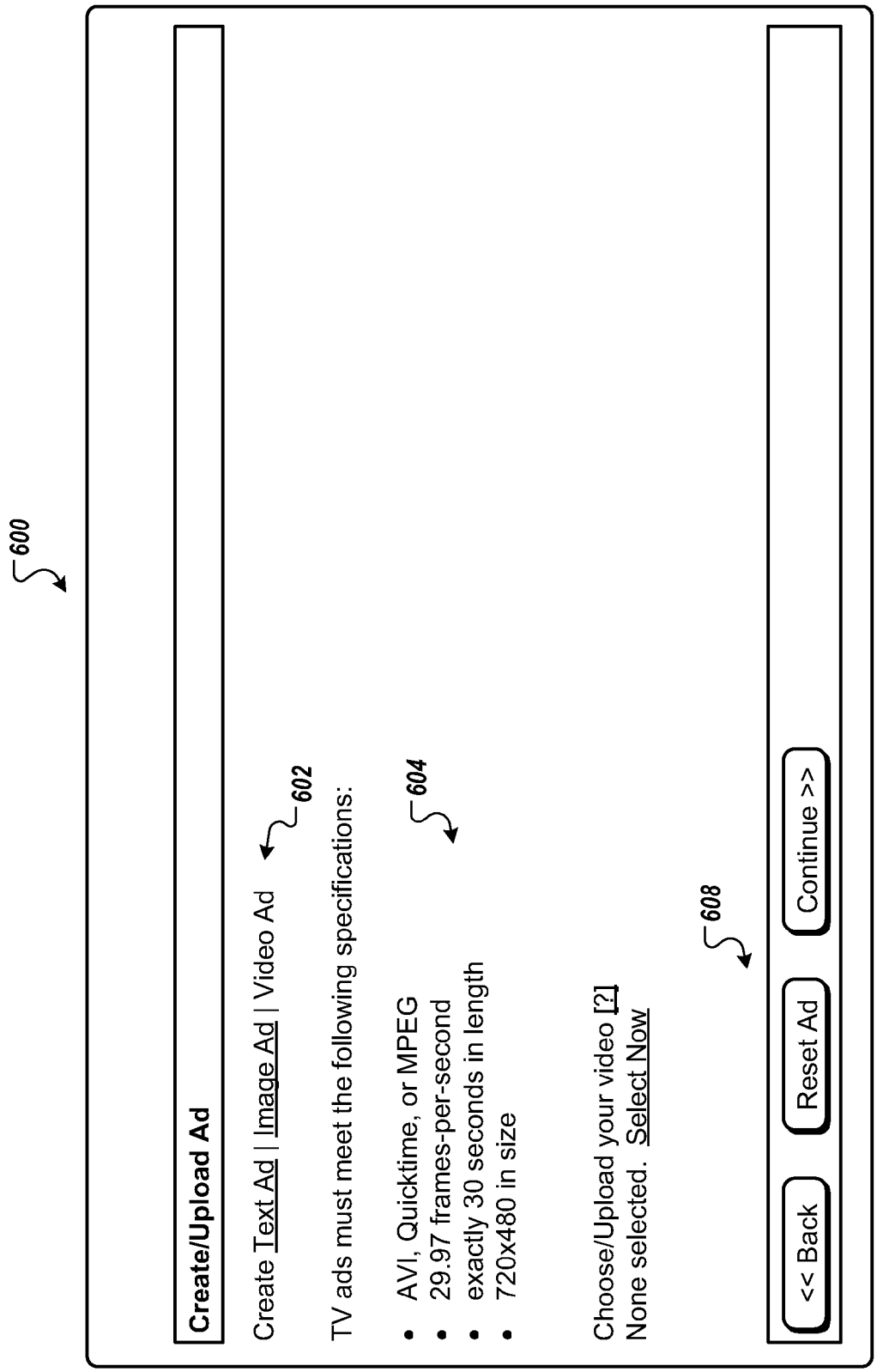
FIG. 6 is a screen shot of an example advertisement creation and upload environment.

FIG. 6 is a screen shot of an example advertisement creation and upload environment 600. The advertisement creation and upload environment 600 can be used by an advertiser to select advertisements for upload to the television advertisement system 100.

An advertisement type can be selected from an advertisement menu 602. For example, the advertisement menu 602 can be utilized to upload a text advertisement, e.g., a ticker advertisement that can be shown on the bottom or the side of a television screen; an image advertisement, such as a logo overlay; and a video advertisement, such as a television commercial.

Advertisement specifications 604 required for uploading an advertisement to the television advertisement system 100 can be displayed beneath a selected advertisement type. For example, the advertisement specifications 604 for a video advertisement 602 are shown.

Navigation buttons 608 can be selected to return to the previous advertisement front end environment 500, or to continue to the next advertisement front end environment, a network and daypart selection environment 700.

Figure 7A:
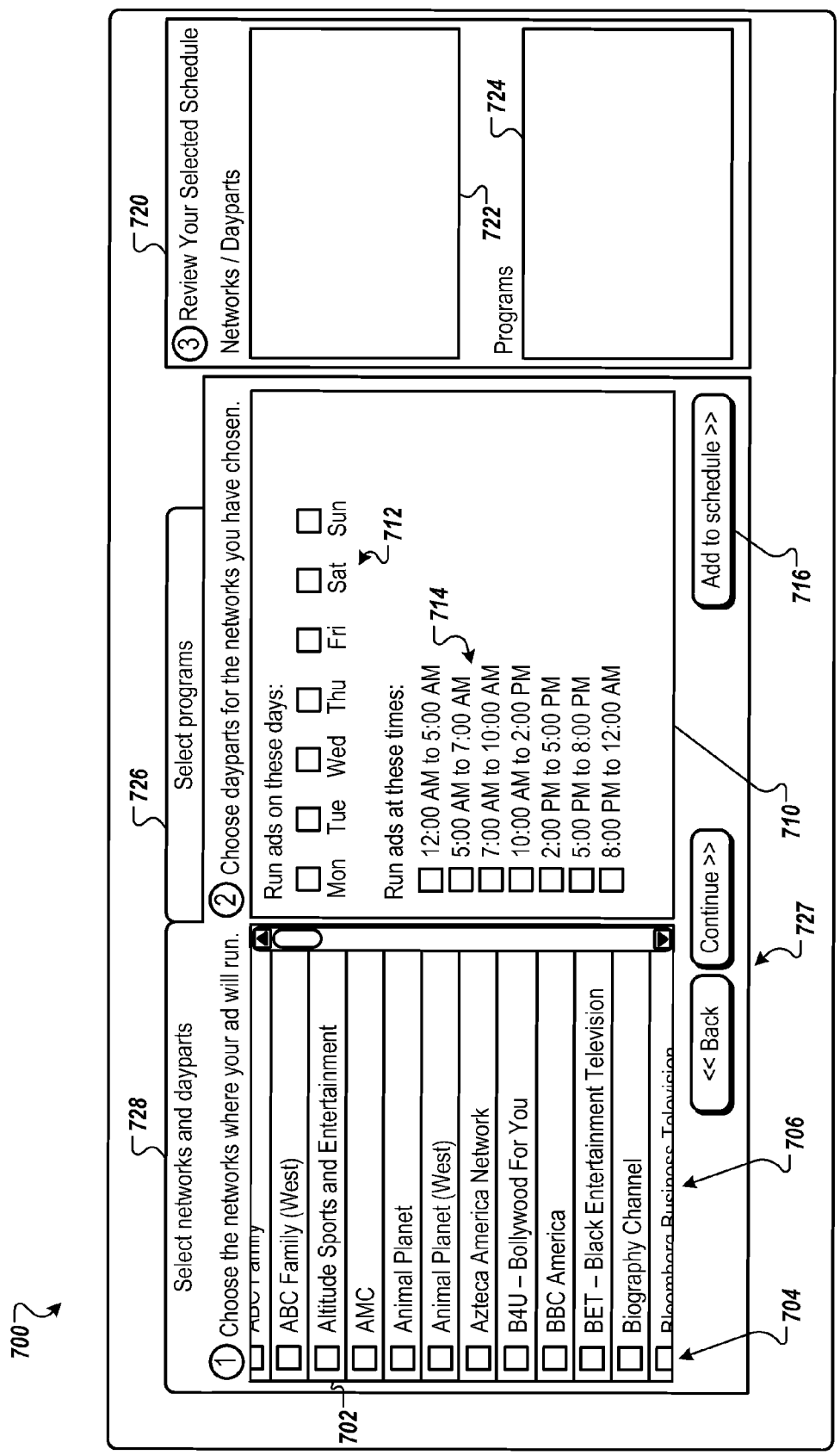
FIG. 7A is an example screen shot of a network and daypart selection environment.

FIG. 7A is an example screen shot of the network and daypart selection environment 700. The network and daypart environment 700 can be used by an advertiser to select networks on which the advertiser desires to advertise and the dayparts during which the advertiser desires to advertise on those networks.

A network frame 702 displays a list of networks on which advertisement spots may be obtained by use of the television advertisement system 100. Each listing in the network frame includes a selection box 704 and network names 706. To target advertisements on a particular network, the advertiser can select a corresponding selection box 704.

A daypart frame 710 displays a list of weekdays 712 and corresponding network dayparts 714 for the weekdays. To advertise during a network dayparts and weekdays, the advertiser can select one or more the corresponding weekdays 712 and one or more corresponding network dayparts 714. Combinations of networks dayparts and weekdays can be added to the schedule by clicking the "add to schedule" selection button 716.

A schedule review frame 720 displays a network/daypart list 722 of specified networks and dayparts, and a program list 724 of specified programs. Specific programs can be added to the program list 724 by use of a program selection environment 730, which is accessed by selecting the select programs tab 726.

Navigation buttons 728 can be used to navigate back to the advertisement creation and upload environment 600, or forward to the pricing environment 800 of FIG. 8.

Figure 7B:
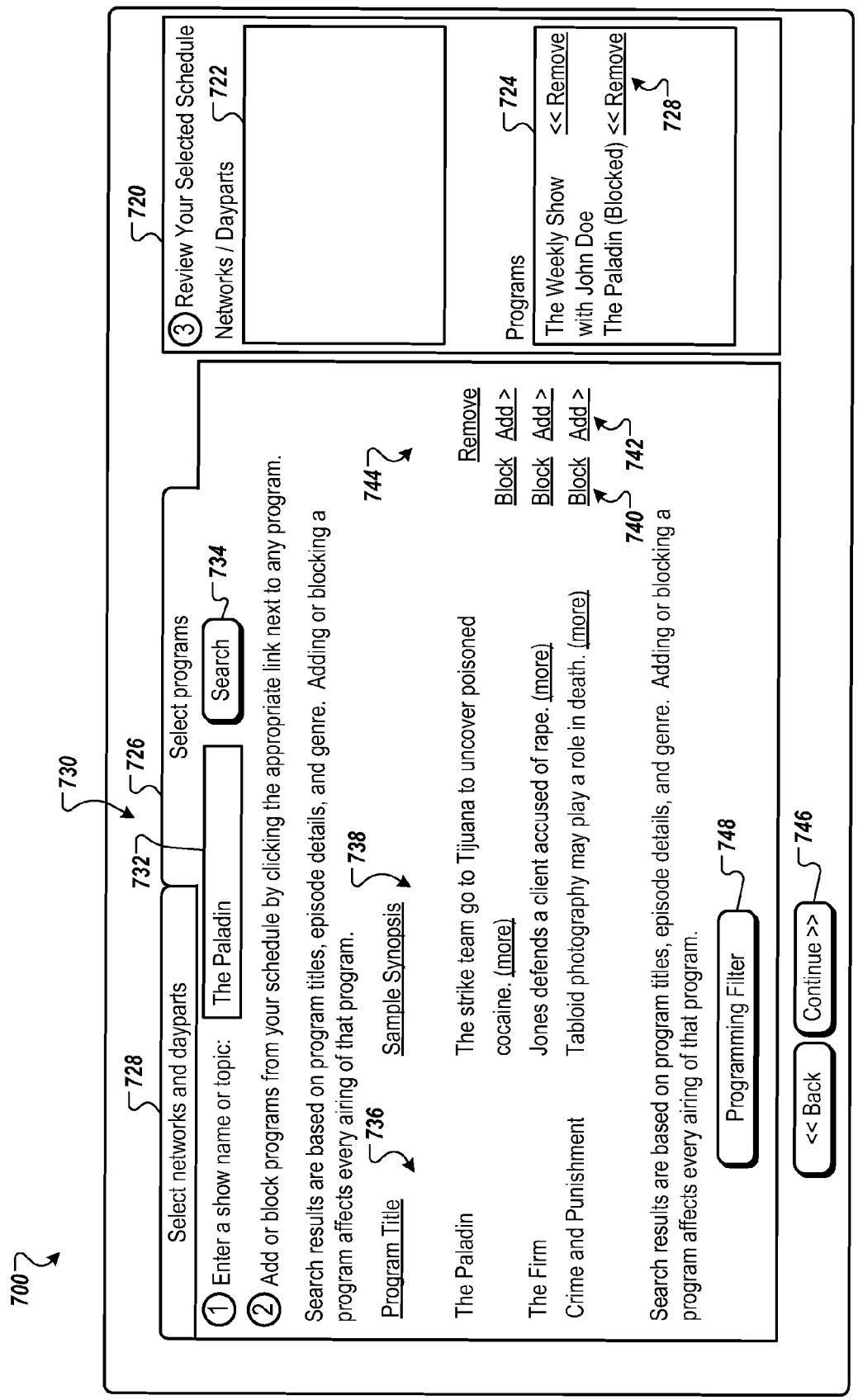
FIG. 7B is a screen shot of an example television program selection environment.

FIG. 7B is a screen shot of an example television program selection environment 730. The program selection environment 730 can be used by advertisers to search television programs for advertising according to search criteria, and select television programs for inclusion or exclusion in an advertising schedule.

A search input field 732 can receive a television program query from an advertiser, and a search based on the query can be initiated by a selection of the search button 734 by the advertiser. Pressing the search button 734 causes a client device displaying the program selection environment 732 to transmit a search command and the television program query to the television advertising system 100. The television advertisement system 100, in turn, searches television program data 203 for television programs that meet a search criterion or search criteria. In some implementations, the television program schedule data are provided by providers 160 on a periodic basis, e.g., weekly or monthly.

The television program query can be freeform text, one or more pairs of the query parameter and query command, or combination of freeform text and pairs of query parameters and query commands. Example free-form text includes program titles, series names, actors' names, or any other text that can be used to identify a television program by metadata associated with the program. Example query commands can include a channel number command specifying a particular channel number, a network command specifying a particular network, a daypart command specifying one or more dayparts, a ratings command specifying a television rating, a syndication command specifying syndicated television programs, and a genre command to identify particular category genres that a television program may belong to, to name just a few.

Television programs meeting the search criterion or search criteria are displayed as search results that include a program title 736, a sample synopsis 738, a block command 740, and an add command 742. Selection of either the block command 740 or the add command 742 adds the television program to the program list 724. As shown in the program list 724, to television programs have been selected. The first television program, "The Weekly Show With John Doe", has been selected for inclusion in an advertising campaign by a previous selection of an add command 742. Thus, advertisements for the advertiser will be eligible for auction pots that are available on this television program. The second television program, "The Paladin", has been selected for exclusion from the advertising campaign by a previous selection of a block command 740. Thus, advertisements for the advertiser will not be eligible for auction spots that are available on this television program.

In some implementations, the search results are based on program titles, episode details, and genre. For example, as shown in FIG. 7B, the television program query "The Paladin" results in the identification of three television programs: "The Paladin", "The Firm", and "Crime and Punishment," as the three television programs belong to the same genre, i.e., crime dramas. In other implementations in which query commands are used, the search results can be based on other factors, such as similar audience demographics, similar program ratings, and/or similar program durations.

In some implementations, television programs are identified based on one or more broad matching functions. One example broad matching function is the identification of related television programs based on out of band data, such as hyperlinks identified in fan sites. For example, the television program query "The Paladin" may also result in the programs "The Firm" and "Crime and Punishment" being identified if fan sites indicate a related fan base for these television programs.

Another broad match function is facilitated by term clustering and query expansion. Search queries can be matched to terms included in the term clusters for program categories to identify programs. For example, to search for television programs on which to advertise diapers, the advertiser can enter the term "diapers." The television advertisement system 100 receives the query, and identifies term clusters that include the term "diapers" and other related terms, such as "training pants." In turn, television programs belonging to these term clusters are identified. Thus, the advertiser need not know the titles of particular television programs to find relevant television programs for advertising.

Programs that are currently shown in the program list 724 can be removed by selecting the remove command 728, or by selecting the remove command 744 if the program is also shown in the search results.

In some implementations, additional search criteria can be used to filter the search results that are determined to be responsive to the television program query. Selecting the programming filter buttons 748 instantiates a programming filter environment 770, which is shown in FIG. 7D.

In some implementations, if an advertiser has selected networks and dayparts so that networks and dayparts are shown in the networks/dayparts list 722, all television programs that are shown on those networks and dayparts can be identified as a default set of search results. Furthermore, in some implementations, search results for television program query can be limited to programs that are shown only during dayparts on networks as identified in the networks/dayparts list. Alternatively, search results for the television program query can be independent of the networks and dayparts identified in the network/dayparts list 722, i.e., the search result can include programs that are shown on networks and/or are aired during different dayparts than the networks and dayparts specified in the networks/dayparts list 722.

Figure 7C:
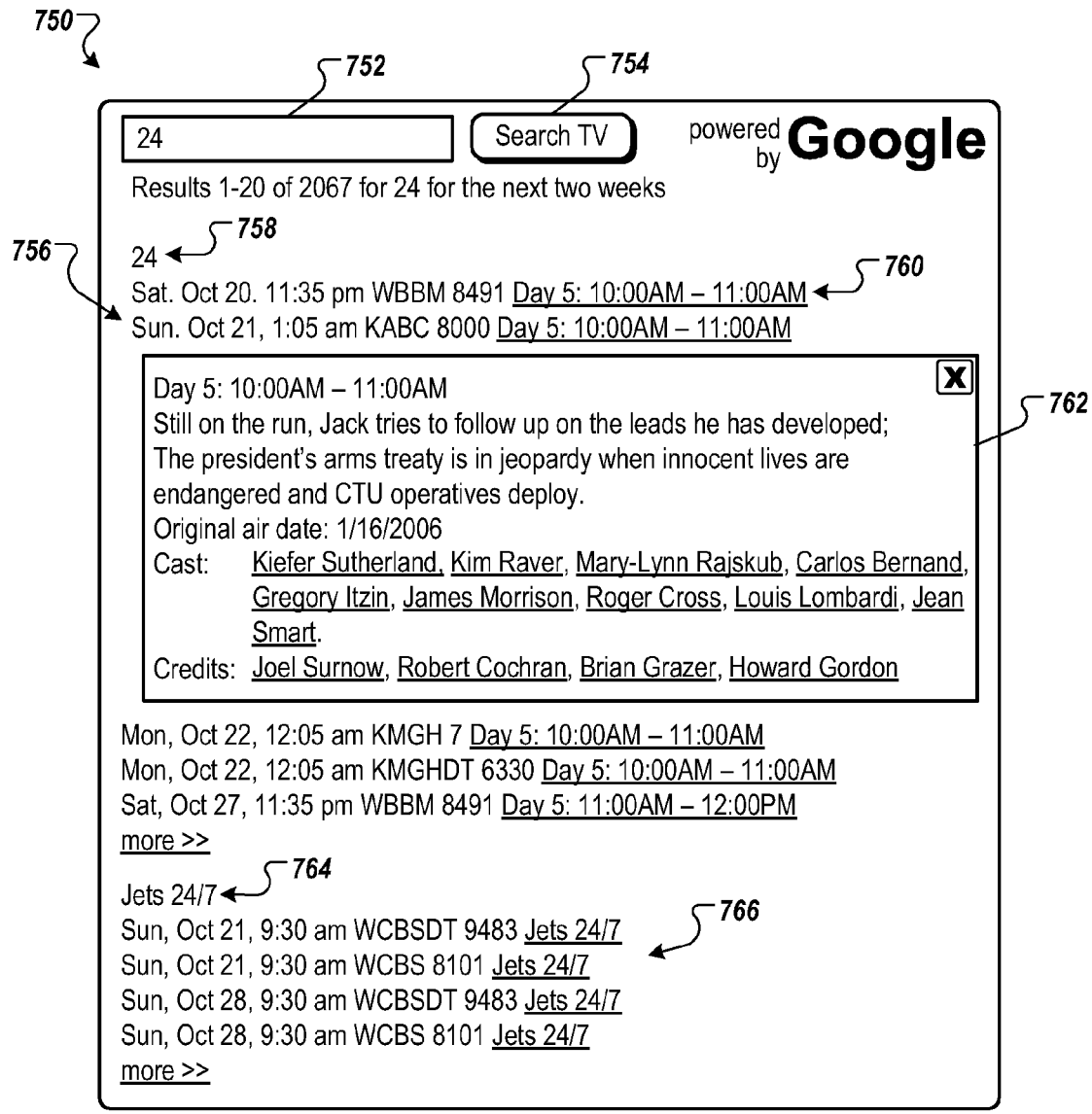
FIG. 7C is a screen shot of an example television program search environment.
Figure 7D:
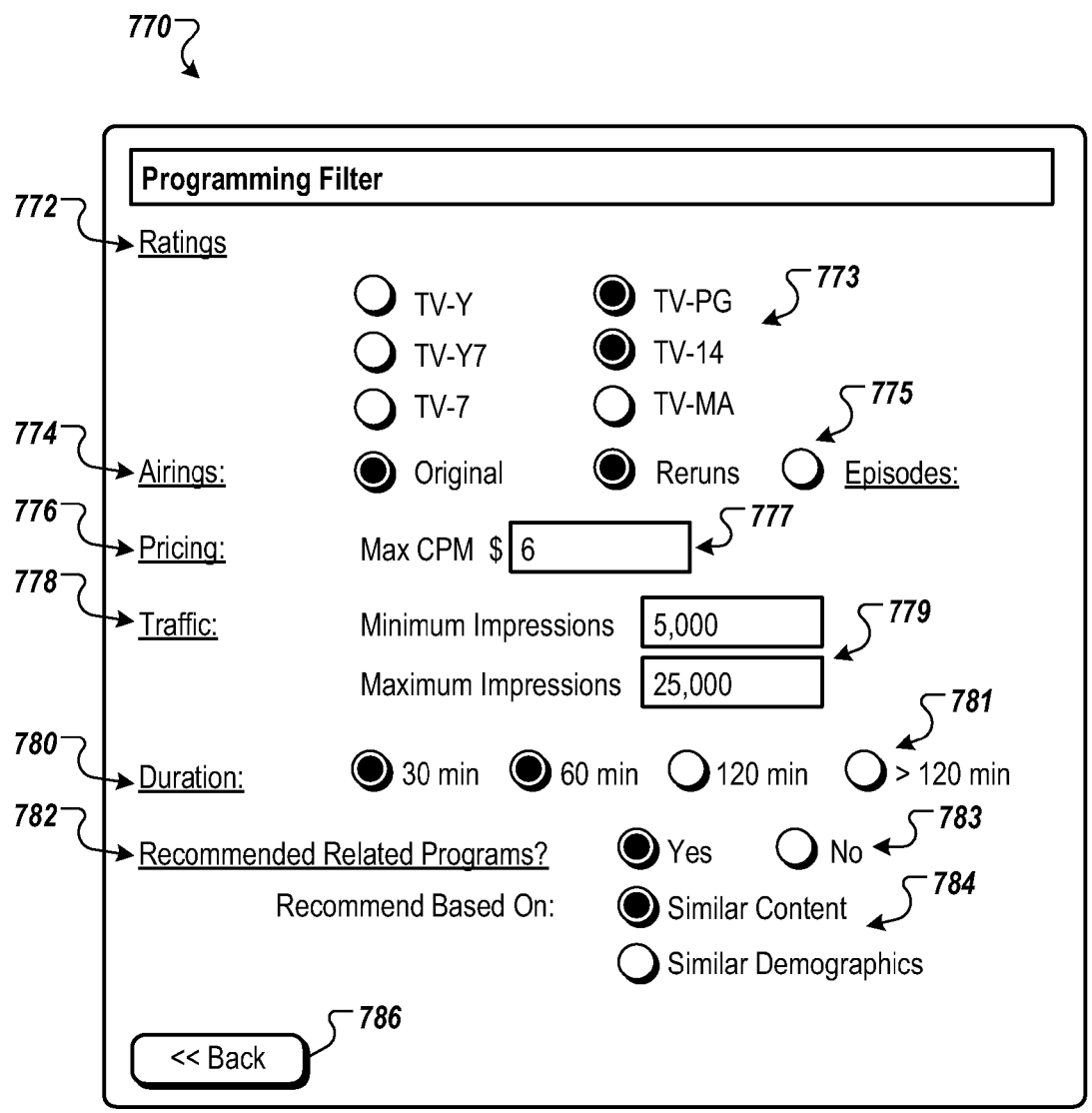
FIG. 7D is a screen shot of an example television program filtering environment.

FIG. 7C is a screen shot of an example television program search environment 750. The television program environment 750 can be used by advertisers to search television programs for advertising according to search criteria. A search input field 752 can receive a television program query from an advertiser, and a search based on the query can be initiated by a selection of the search button 754 by the advertiser.

In the example environment 730 of FIG. 7B, the search results were limited to a single search result per television program. In the example television program search environment 750 of FIG. 7C, however, there are multiple search results for matching television programs, with each search result being an airing of the television program. The television program search environment 750 can be used as an alternate search environment in the program selection environment 730 of FIG. 7B.

For example, the television program query "24" results in the identification of search results 756 that include two television programs 758 and 764. Each of the television programs 758 and 764 include results 760 and 766 for multiple airings. Each of the results 760 and 766 includes the air date, the air time, the station airing the television program on the air date and the air time, and the episode title of the television program.

Selection of a search result can instantiate a drop-down box 762 below the respective search result. The drop-down box 762 includes additional information about the particular television program corresponding to the selected search result. The additional information can include an episode synopsis, the original air date, the cast, and other credits. The additional information shown in the drop-down box 762 is not exhaustive, and other information can also be shown such as the program rating, the genre, and estimated impressions, for example.

FIG. 7D is a screen shot of an example program filtering environment 770. In some implementations, the program filtering environment 770 is instantiated by selection of the programming filter button in the program selection environment 730. In these implementations, the programming filtering environment can be used to limit the search results that are displayed as search results. In other implementations, the programming filter can be used to automatically filter programs for advertising that are aired on networks during dayparts listed in the networks/dayparts list 722. The filtering can be either inclusive or exclusive, depending on the implementation used.

Example filtering criteria can include ratings criteria 772, airings criteria 774, pricing criteria 776, traffic criteria 770, duration criteria 780, and recommendation criteria 782. Other criteria, however, can also be used.

The ratings criteria 772 include a plurality of selectable program ratings 773. Selection of a program rating results in inclusion of a television program having associated selected rating in the advertising campaign or search results.

The airings criteria 774 include selectable airing types 775. For example, selection of the original airing criterion results in inclusion of a television programs that are being originally aired in the advertising campaign or search results. Selection of the reruns criterion results in the inclusion of television programs that are being rerun in the advertising campaign or search results. Selection of the episodes criterion can instantiate an episode selection environment (not shown) through which the advertiser can select specific episodes of a television program for inclusion in the advertising campaign or search results.

The pricing criteria 776 include a max CPM field 777. By entering a maximum CPM into the field 777, an advertiser can exclude television programs for which the cost of an advertising spot is exceeded by the maximum CPM from the advertising campaign or search results.

The traffic criteria 778 include minimum and maximum impressions fields 779. By entering minimum and maximum impression counts into the respective fields, an advertiser can exclude television programs for which the estimated number of impressions are less than the minimum impression count or greater than the maximum impression count from the advertising campaign or the search results.

The duration criteria 780 include selectable durations 781. Selection of a selectable duration results in a television program having maturation being included in the advertising campaign or the search results.

The recommendation criteria 782 include a yes/no selection 783 and similarity criteria 784. Enabling of the recommendation criteria 782 results in the inclusion of additional television programs in the advertising campaign or search results that are, according to the similarity criteria 784, similar to television programs already included in the advertising campaign or responsive to a television program query.

Selection of the back button 786 returns the advertiser to a previous environment.

Many other filtering criteria can also be used, such as, delayed programming criteria and special programming criteria. Example delayed programming criteria can specify whether an episode of television program that is included in an advertising campaign should be excluded if the airing of the television program is delayed. Airings and television programs can be delayed as a result of a sporting event or special news event. In some implementations, the delay window can be used to specify a maximum time of the airing delay, e.g., five minutes, before the particular episode should be excluded from the campaign. Example special programming criteria can specify whether an advertising campaign will include a television program that is a special airing on a network during an air time that are specified in the network/dayparts list 722.

In some implementations, results for programs meeting the filtering criteria are presented with corresponding data that meet the criteria. For example, a program meeting the criteria specified in FIG. 7D could be presented with the corresponding rating, airing type, impression value, traffic estimate, duration, and whether it is a related program.

FIG. 8 is a screen shot of an example pricing environment 800. The example pricing environment 800 can be used by an advertiser to set the duration of an advertising campaign and spending limits for the campaign.

Date fields 802 allow the advertiser to specify how long the advertiser desires to run the campaign. As shown in FIG. 8, the advertising campaign will run from Oct. 17, 2008 to Dec. 30, 2008.

Budget data, such as weekly spend data, can be input into a budget field 804. The budget data can be utilized to ensure that an advertiser budget is not exceeded during a specified period.

A cost per action, e.g., a cost per thousand impressions, can be input in a cost per action field 806. The cost per action can be a maximum cost per action that an advertiser is willing to pay for a particular action. Other costs per actions can also be used, e.g., a cost per slot, etc.

Navigation buttons 808 can be selected to return to the previous advertisement front end environment 730, or to continue to the next advertisement front end environment, a review environment 900.

Figure 9:
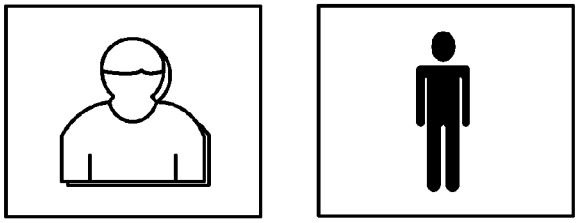
FIG. 9 is a screen shot of an example review environment.

FIG. 9 is a screen shot of an example review environment 900. The review environment 900 summarizes the advertisements parameters entered by an advertiser during the process of creating an advertisement campaign. A parameter summary 902 can, for example, summarize advertisement parameters, such as the campaign name, target languages, national, regional and local locations of the target customers/viewers, and a weekly budget.

An Ad Group summary 904 can also be displayed, if applicable. As shown in FIG. 9, an Ad Group summary 904 displays a still image of the advertisements in the Ad Group, entitled "X1" and "X2", respectively, a list of target programs 908, and a maximum cost per action 910 for the advertisements in the Ad Group.

Navigation buttons 912 can be selected to return to the previous advertisement front end environment 800, create another Ad Group, or save the campaign.

Figure 10:
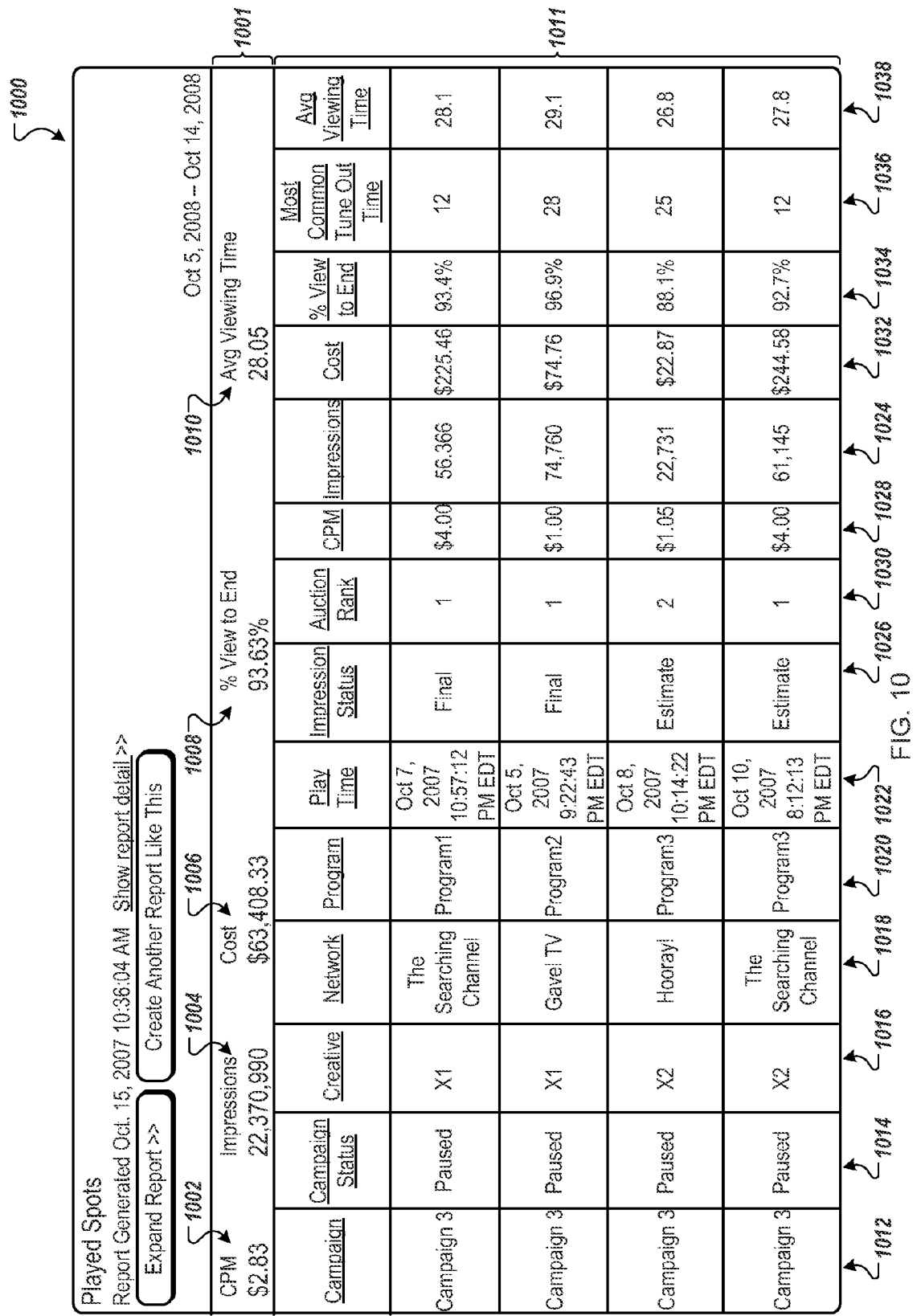
FIG. 10 is a screen shot of an example reporting environment.

FIG. 10 is a screen shot of an example reporting environment 1000. The reporting environment 1000 can be provided to the advertiser on a periodic basis, e.g., weekly, or alternatively can be generated by the advertiser by use of the advertisement front end engine 120. The reporting environment 1000 provides a detailed report of advertisement airings, impressions, and associated costs with an advertising campaign.

In some implementations, the report 1000 includes summary data 1001 and detailed data 1011. The summary data 1001 summarizes the campaign performance, and the detailed data 1011 provides detailed performance data for each airing of the creative of an advertising campaign.

Summary CPM data 1002 provides the average CPM for all airings in a campaign. In the example report 1000 in FIG. 10, the summary CPM data 1002 is the average cost per 1000 impressions for the entire campaign. Summary impressions data 1004 provides a total number of impressions for all advertisements in the campaign. Summary cost data 1006 provides the total cost of the advertising campaign, i.e., the number of impressions divided by the CPM value.

The summary view to and percentage data 1008 provides the percentage of airings that were viewed in their entirety. The summary average viewing time data 1010 provides the average viewing time for all airings that were aired during the campaign.

The summary data 1001 can be obtained from the reporting engine 128 and the accounting engine 130 after these engines analyze the performance data 108 and log data 106 of the advertisements.

Each row in the detailed data of 1011 corresponds to an airing of an advertisement in a campaign. The data from all of these rows can be summarized to generate the summary data 1001.

The campaign data 1012 specifies the campaign to which the airing corresponds. As an advertiser may have multiple campaigns running at any one time, the campaign data 1012 is used to key to specific campaigns. The campaign status data 1014 provides the status of the campaign, i.e. running, paused, or completed.

The creative data 1016 specifies the creative that was aired, and the network data 1018 and the program data 1020 specify the network and program on which the airing occurred. The playtime data 1022 specifies the actual time that the creative aired on the specified network in the market.

The impressions data 1024 specifies the number of impressions for the airing, i.e., the number of viewing devices 164 that were used to present the creative during a particular airing. The impression status data 1026 specifies whether the impression data 1024 is final or estimated. Impression data 1024 is final if, for example, a reporting period has expired, such as one week, or if an impression estimate exceeds the minimum accuracy threshold. Likewise, the impression data is an estimate if, for example, the reporting period has not expired or the impression estimate does not exceed a minimum accuracy threshold. Other ways of determining an impression status can also be used.

The CPM data 1028 specifies the CPM for the airing. As the CPM may vary according to auction demands, air times, estimated impressions, and other factors, the CPM for each airing may differ. Thus the CPM data 1028 specifies the amount the advertiser will be charged for the airing on a CPM basis.

The auction rank data 1030 specifies the rank the creative had in an auction for that airing. Typically this value will be "1", but in some situations it may be lower. For example, the creative may have taken second place in the auction, but because of a technical difficulty or some other event, the creative that actually won the auction may not have been available for airing. Accordingly, the next ranked creative is selected for airing.

The cost data 1032 specifies the cost for that airing. In the example report 1000, the value in the cost data 1032 is equal to the number of impressions divided by the CPM value.

The viewed to end 1034 provides percentage of the impressions in which the creative was viewed in its entirety. The most common tune out time data 1036 provides the time, in seconds, at which the highest number of viewing devices 164 tuned to another channel during the airing of the creative. The average viewing time data 1038 provides the average viewing time of the creative for that airing.

The television advertisement front end environments of FIG. 5-10 have been described in the context of creating an advertising campaign with particular advertisements. However, an advertiser need not specify particular advertisements for a particular campaign when targeting television programs. For example, in other implementations, an advertiser may have a pool of advertisements and each advertisement may be selected for a particular television program based on various targeting criteria. For example, an insurance company may have multiple advertisements for various insurance products, such as auto, home, and health insurance. Each of these advertisements may have associated targeting criteria, such as a target demographic. The insurance company (or advertising agency representing the insurance company) can select multiple television programs on which it desires the advertisements to be aired. Thereafter, advertisements from the pool of advertisements will be aired on those programs based on how well the target demographic of the advertisement matches the audience demographic of the television programs and auction results.

Figure 11:
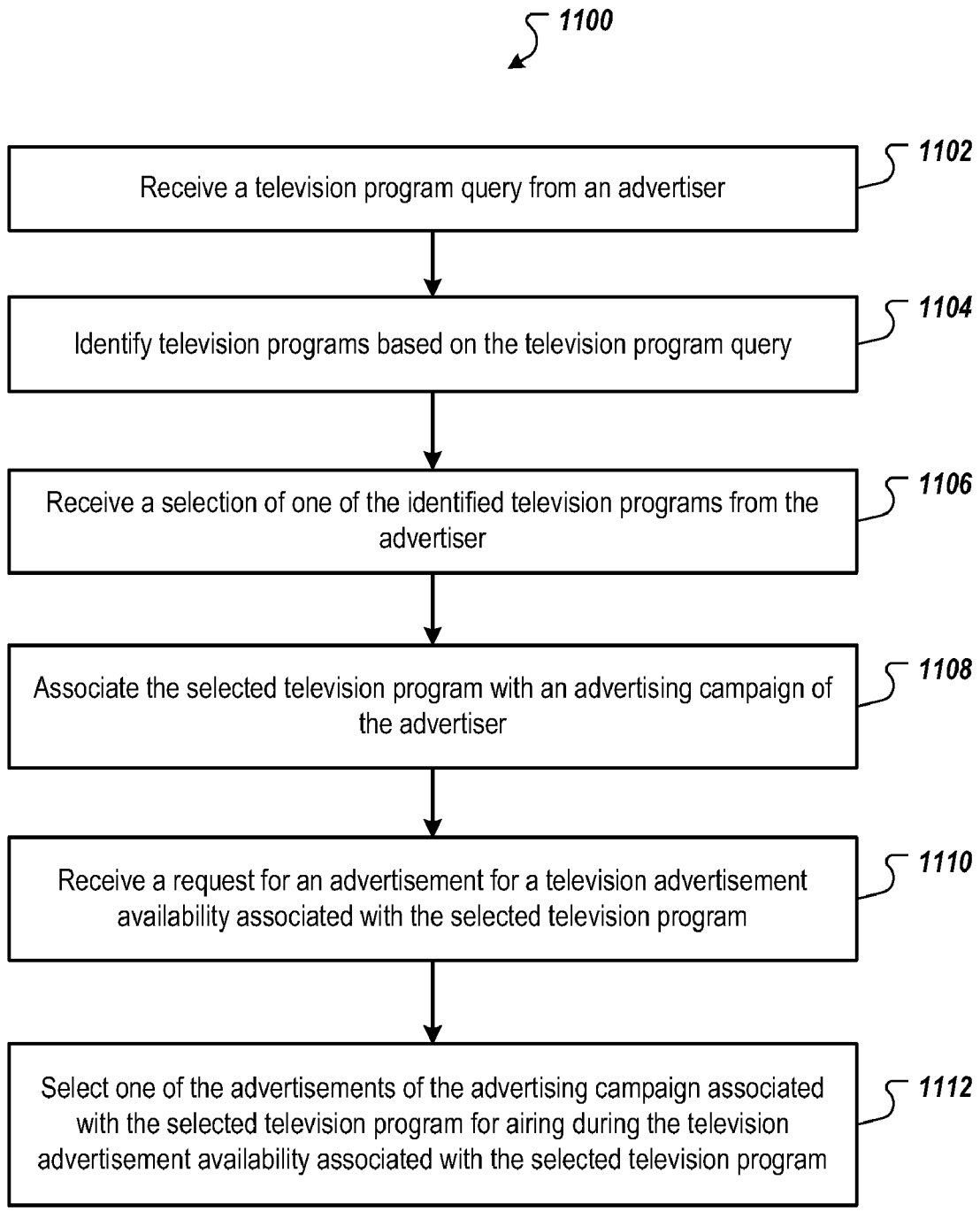
FIG. 11 is a flow diagram of an example process for targeting television programs for advertising.

FIG. 11 is a flow diagram of an example process 1100 for targeting television programs for advertising. The process 1100 can, for example, be implemented in the television advertising system 100 of FIG. 1.

A television program query from an advertiser is received (1102). For example, the advertisement front end 120 can receive a television program query from an advertiser through the program selection environment 730.

Television programs based on the television program query are identified (1104). For example, the advertisement front end engine 120 can search television programming data provided by the providers 160 and other programming data stored in the out of band data 110. Television programming data from other sources can also be searched. The advertisement front end engine 120 can provide a listing of television programs that exactly matched the television program query, or can provide a listing of television programs based on various matching criteria, such as program titles, episode details, genre, and similar demographics.

A selection of one of the identified television programs from the advertiser is received (1106), and the selected television program is associated with an advertising campaign of the advertiser (1108). For example, an advertiser can use the advertisement front end engine 120 to select one or more of the identified television programs for inclusion in (or exclusion from) an advertising campaign, and the association can be stored in advertising parameters data store 104.

A request for an advertisement for a television advertisement availability of an advertisement associated with a selected television program is received (1110). For example, the auction engine can receive a request for an advertisement from the provider 160. The auction engine 132 can then conduct an auction to select the winning advertisement. Provided the request is for a particular television program targeted by an advertising campaign, an advertisement for that campaign can participate in the auction.

One of the advertisements for the advertising campaign associated with the selected television program for airing during the television advertisement availability is selected (1112). For example, if the requests for particular television program targeted by an advertising campaign, and an advertisement in that campaign wins the auction, then that advertisement can be selected for airing during the television advertisement availability.

Figure 12:
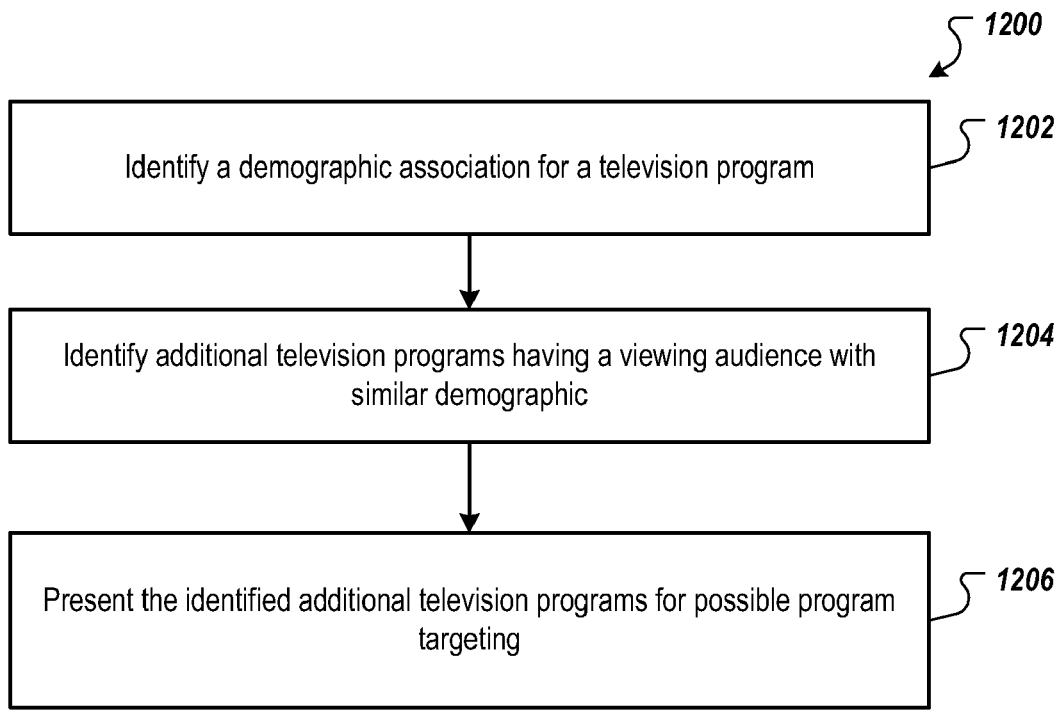
FIG. 12 is a flow diagram of an example process for targeting similar television programs.

FIG. 12 is a flow diagram of an example process 1200 for targeting similar television programs. The process 1200 can, for example, be implemented in the television advertising system 100 of FIG. 1.

A demographic association for television program is identified (1202). For example, the reporting engine can access set top logs from viewing devices 164 to identify audience demographics for television programs. These demographics are then provided to the advertisement front end engine 120.

Additional television programs having a viewing audience with a demographic similar to the demographic associated with the television program is identified (1204). For example, the advertisement front end engine 120 can identify television programs having similar demographics to television programs that have been selected by the advertiser for inclusion in a campaign.

The identified additional television programs are presented for possible inclusion in program targeting (1206). For example, the advertisement front end engine 120 can present the identified additional television programs to the advertiser through the television program search environment 750.

Figure 13:
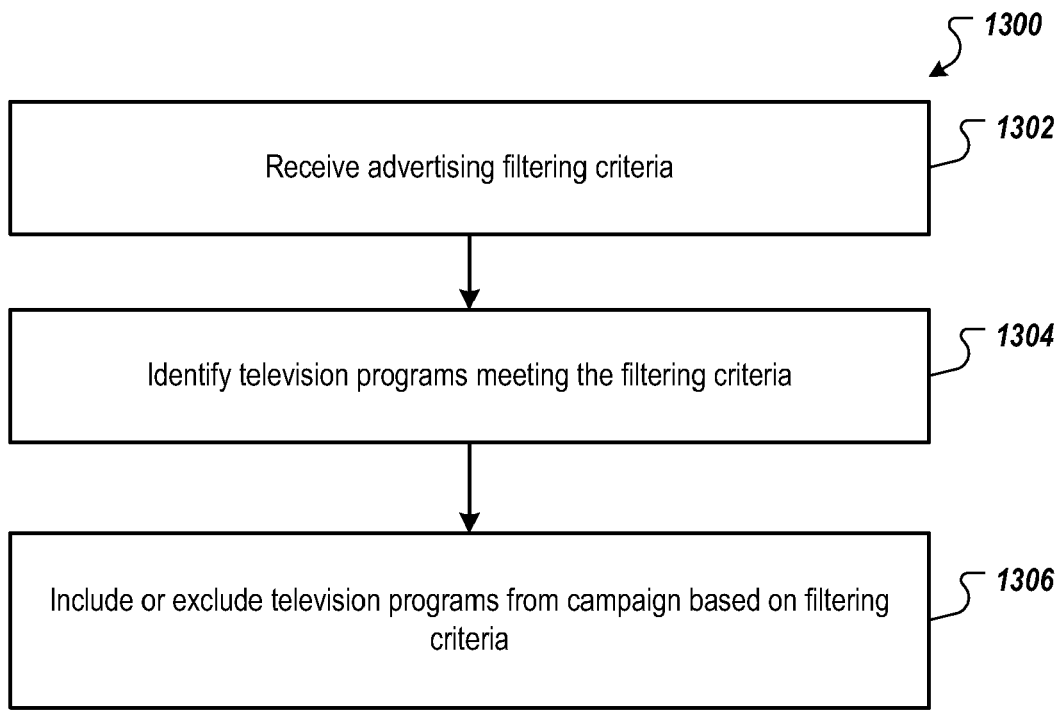
FIG. 13 is a flow diagram of an example process for filtering television programs for advertising.

FIG. 13 is a flow diagram of an example process 1300 for filtering television programs for advertising. The process 1300 can, for example, be implemented in the television advertising system 100 of FIG. 1.

Advertising filtering criteria are received (1302). For example, an advertiser can select various filtering criteria through the program filtering environment 770 rendered on the client device. The client device can then provide selection data to the television advertising system 100.

Television programs meeting the filtering criteria are identified (1304). For example, the advertisement front end engine 120 can search television programming data provided by the providers 160 and other programming data stored in the out of band data 110 for television programs that meet the filtering criteria.

Television programs are included or excluded from a campaign based on the filtering criteria (1306). For example, the advertisement front end engine 120 can present the television programs that are determined to meet the filtering criteria to the advertiser for inclusion or exclusion into an advertising campaign. Alternatively, the television programs that are determined to meet the filtering criteria can be automatically included (or excluded) in a campaign if those programs are aired on networks during dayparts specified and the network/daypart list 722.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A television advertising system, comprising:
a data storage device storing associations of television advertisement availabilities and television programs, each television advertisement availability being associated with a television program, the television advertisement availability scheduled to occur during a scheduled airing of the television program, and storing associations of demographics with the television programs, each demographic association for a television program defining demographics of a viewing audience for the television program;
a non-transitory computer storage device storing software comprising instructions that are executable by one or more computers and upon such execution can cause the computers to perform operations comprising:
receiving a television program query from an advertiser;
identifying television programs based on the television program query;
for each of the television programs identified based on the television program query:
identifying a demographic association for the television program; and
using the identified demographic association to identify additional television programs having a viewing audience with similar demographics;
providing the identified television programs to the advertiser in response to the television program query, the identified television programs including the television programs identified based on the television program query and the television programs identified based on the demographic associations;
receiving a selection of one of the identified television programs from the advertiser;
associating the selected television program with an advertising campaign of the advertiser, the advertising campaign including one or more television advertisements;
receiving a request for an advertisement for a television advertisement availability associated with the selected television program; and
selecting, in response to the request, one of the advertisements of the advertising campaign associated with the selected television program for airing during the television advertisement availability associated with the selected television program.

2. The system of claim 1, wherein:
the data store further stores an association of dayparts with the associations of television advertisement availabilities and television programs, each daypart defining a time period during a television programming day; and
the operation of identifying television programs based on the television program query comprises identifying television programs that air during a daypart defined by the television program query.

3. The system of claim 1, wherein:
the data store further stores an association of channels with the associations of television advertisement availabilities and television programs, each channel for each association specifying a channel on which the associated television program will be aired; and
the operation of identifying television programs based on the television program query comprises identifying television programs that air on a channel defined by the television program query.

4. The system of claim 1, wherein:
the data store further stores an association of program categories and television programs, each program category for each television program specifying a program category to which the television program belongs; and
the operation of identifying television programs based on the television program query comprises identifying television programs that belong to a category defined by the television program query.

5. The system of claim 1, wherein:
the data store further stores an association of impression estimates with the associations of television advertisement availabilities and television programs, each impression estimate for each association specifying an impression value for the scheduled airing of the television program; and
presenting the identified television programs to the advertiser in response to the television program query comprises presenting the television programs with their associated impression values.

6. The system of claim 1, wherein:
the operation of identifying television programs based on the television program query comprises identifying a television series of the television program;
the operation of presenting the identified television programs to the advertiser in response to the television program query comprises, for each television series, presenting a scheduling preview for the television series, the scheduling preview providing scheduled airings for the television series over a preview period.

7. The system of claim 1, wherein the software comprises further instructions that are executable by the one or more computers and upon such execution can cause the computers to perform operations comprising:
receiving an exclusion of one of the identified television programs from the advertiser;
associating the excluded television program with the advertising campaign of the advertiser; and
precluding selection of any advertisements of the advertising campaign associated with the excluded selected television program for airing with the excluded television program.

8. The system of claim 1, wherein:
the data store further stores an association of geographic data with the associations of television advertisement availabilities and television programs, each geographic data association specifying one or more geographic locations at which the associated television program will be aired; and
presenting the identified television programs to the advertiser in response to the television program query comprises presenting the television programs that are only aired in one or more geographic location specified in the television program query.

9. The system of claim 1, wherein:
the television advertisement availability comprises a television advertisement pod.

10. The system of claim 1, wherein:
the television advertisements comprise text streams.

11. A computer-implemented method, comprising:
receiving a television program query from an advertiser;
identifying television programs based on the television program query;
accessing, by a computer, associations of demographics with the television programs, each demographic association for a television program defining demographics of a viewing audience for the television program;
for each television program identified based on the television program query:
identifying a demographic association for that television program; and
using the identified demographic association to identify additional television programs having a viewing audience with similar demographics;
providing the identified television programs to the advertiser in response to the television program query, the identified television programs including the television programs identified based on the television program query and the television programs identified based on the demographic associations;
receiving a selection of one of the identified television programs from the advertiser;
associating the selected television program with an advertising campaign of the advertiser, the advertising campaign including one or more television advertisements;
receiving a request for an advertisement for a television advertisement availability associated with the selected television program, the television advertisement availability scheduled to occur during a scheduled airing of the television program; and
selecting, in response to the request, one of the advertisements of the advertising campaign associated with the selected television program for airing during a television advertisement availability associated with the selected television program.

12. The method of claim 11, further comprising:
storing an association of dayparts with the associations of television advertisement availabilities and television programs, each daypart defining a time period during a television programming day; and
wherein identifying television programs based on the television program query comprises identifying television programs that air during a daypart defined by the television program query.

13. The method of claim 11, wherein:
identifying television programs based on the television program query comprises identifying a television series of the television program; and
presenting, for each television series, a scheduling preview for the television series, the scheduling preview providing scheduled airings for the television series over a preview period.

14. The method of claim 11, further comprising:
receiving an exclusion of one of the identified television programs from the advertiser;
associating the excluded television program with the advertising campaign of the advertiser; and precluding selection of any advertisements of the advertising campaign associated with the excluded selected television program for airing with the excluded television program.

15. The method of claim 11, wherein the television advertisement availability comprises a television advertisement slot.

16. A television advertising system, comprising:
a non-transitory computer storage system storing instructions defining an advertisement front end engine and an auction engine, the instructions executable by a computer system, and wherein:
the instructions defining the advertisement front end cause the computer system to receive a television program query from an advertiser and identify television programs relevant to the television program query, and for each of the television programs identified based on the television program query, identify a demographic association for the television program and use the identified demographic association to identify additional television programs having a viewing audience with similar demographics, and associate identified television programs that include the television programs identified based on the program query and based on the demographic associations that are selected by the advertiser with an advertising campaign for the advertiser; and the instructions defining the auction engine cause the computer system to receive a request for an advertisement for a television advertisement availability associated with one of the selected television programs, and select, in response to the request, one of the advertisements of the advertising campaign for airing during a television advertisement availability associated with the selected television program.

* * * * *